US00RE48412E

(19) United States
(12) Reissued Patent
Chishti

(10) Patent Number: US RE48,412 E
(45) Date of Reissued Patent: *Jan. 26, 2021

(54) BALANCING MULTIPLE COMPUTER MODELS IN A CALL CENTER ROUTING SYSTEM

(71) Applicant: Afiniti International Holdings, Ltd., Hamilton (BM)

(72) Inventor: Zia Chishti, Washington, DC (US)

(73) Assignee: Afiniti, Ltd., Hamilton (BM)

( * ) Notice: This patent is subject to a terminal disclaimer.

(21) Appl. No.: 14/788,469

(22) Filed: Jun. 30, 2015

Related U.S. Patent Documents

Reissue of:

(64) Patent No.: 8,472,611
Issued: Jun. 25, 2013
Appl. No.: 12/266,461
Filed: Nov. 6, 2008

U.S. Applications:

(63) Continuation of application No. 14/750,965, filed on Jun. 25, 2015, which is an application for the reissue of Pat. No. 8,472,611.

(51) Int. Cl.
*H04M 3/00* (2006.01)
*H04M 3/523* (2006.01)

(52) U.S. Cl.
CPC ..... *H04M 3/5232* (2013.01)

(58) Field of Classification Search
CPC ..... H04M 3/00
See application file for complete search history.

(56) References Cited

U.S. PATENT DOCUMENTS 5,155,763 A 10/1992 Bigus et al.
5,206,903 A 4/1993 Kohler et al. ..... H04M 3/5233 379/214.01

(Continued)

FOREIGN PATENT DOCUMENTS

AU 2008349500 C1 5/2014
AU 2009209317 B2 5/2014

(Continued)

OTHER PUBLICATIONS

Stanley, J., R. Saltzman and V. Mehrotra "Call Center Operations Using Performance-Based Routing Strategies", California Journal of Operations Management, vol. 6, No. 1, pp. 24-32, Feb. 2008.*

(Continued)

*Primary Examiner* — Luke S Wassum
(74) *Attorney, Agent, or Firm* — Wilmer Cutler Pickering Hale and Dorr LLP

(57) ABSTRACT

Systems and methods are disclosed for routing callers to agents in a contact center utilizing a multi-layer processing approach to matching a caller to an agent. A first layer of processing may include two or more different computer models or methods for scoring or determining caller-agent pairs in a routing center. The output of the first layer may be received by a second layer of processing for balancing or weighting the outputs and selecting a final caller-agent match. The two or more methods may include conventional queue based routing, performance based routing, pattern matching algorithms, affinity matching, and the like. The output or scores of the two or more methods may be processed be the second layer of processing to select a caller-agent pair and cause the caller to be routed to a particular agent.

21 Claims, 9 Drawing Sheets

(56) References Cited

U.S. PATENT DOCUMENTS 5,327,490 A 7/1994 Cave
5,452,350 A * 9/1995 Reynolds ..... H04Q 3/0016 379/112.01
5,537,470 A 7/1996 Lee
5,594,791 A * 1/1997 Szlam ..... G06Q 30/016 379/265.09
5,702,253 A 12/1997 Bryce et al.
5,825,869 A 10/1998 Brooks et al. ..... H04M 3/5233 379/265.12
5,903,641 A 5/1999 Tonisson
5,907,601 A 5/1999 David et al.
5,926,538 A 7/1999 Deryugin et al. ..... H04M 3/36 379/220.01
5,963,635 A * 10/1999 Szlam ..... G06Q 30/016 379/216.01
6,049,603 A 4/2000 Schwartz et al.
6,052,460 A 4/2000 Fisher et al.
6,064,731 A 5/2000 Flockhart et al.
6,088,444 A 7/2000 Walker et al.
6,163,607 A 12/2000 Bogart et al. ..... H04M 3/5233 379/265.02
6,222,919 B1 4/2001 Hollatz et al. ..... H04M 3/5233 379/265.12
6,292,555 B1 9/2001 Okamoto
6,324,282 B1 11/2001 McIllwaine et al.
6,333,979 B1 12/2001 Bondi et al.
6,389,132 B1 5/2002 Price
6,389,400 B1 5/2002 Bushey et al. ... G06Q 10/06311 705/7.14
6,408,066 B1 6/2002 Andruska et al. .. H04M 3/5233 379/265.12
6,411,687 B1 6/2002 Bohacek et al. ..... H04M 3/51 379/201.11
6,424,709 B1 7/2002 Doyle et al. ..... H04M 3/5233 379/265.02
6,434,230 B1 8/2002 Gabriel ..... H04M 3/5232 379/265.01
6,496,580 B1 12/2002 Chack
6,504,920 B1 1/2003 Okon et al.
6,519,335 B1 2/2003 Bushnell
6,535,601 B1 3/2003 Flockhart et al.
6,570,980 B1 5/2003 Baruch
6,577,727 B1 * 6/2003 Hymel ..... H04M 3/5232 379/265.05
6,587,556 B1 7/2003 Judkins et al.
6,603,854 B1 8/2003 Judkins et al.
6,639,976 B1 10/2003 Shellum et al.
6,661,889 B1 12/2003 Flockhart ..... H04M 3/5232 379/265.05
6,704,410 B1 3/2004 McFarlane et al. ..... H04M 3/5233 379/265.05
6,707,904 B1 3/2004 Judkins et al.
6,714,643 B1 * 3/2004 Gargeya ..... H04M 3/523 379/265.02
6,763,104 B1 7/2004 Judkins et al. ..... H04M 3/5233 379/265.09
6,774,932 B1 8/2004 Ewing et al.
6,775,378 B1 8/2004 Villena et al.
6,798,876 B1 9/2004 Bala ..... H04M 3/5233 379/265.02
6,829,348 B1 12/2004 Schroeder et al.
6,832,203 B1 12/2004 Villena et al.
6,859,529 B2 2/2005 Duncan et al.
6,922,466 B1 7/2005 Peterson et al.
6,937,715 B2 8/2005 Delaney
6,956,941 B1 10/2005 Duncan et al.
6,970,821 B1 11/2005 Shambaugh et al.
6,978,006 B1 12/2005 Polcyn
7,023,979 B1 4/2006 Wu et al. ..... H04M 3/5233 379/265.11
7,039,166 B1 5/2006 Peterson et al.
7,050,566 B2 5/2006 Becerra et al. ..... H04M 3/5166 379/265.12
7,050,567 B1 5/2006 Jensen
7,062,031 B2 6/2006 Becerra et al.
7,068,775 B1 6/2006 Lee
7,092,509 B1 8/2006 Mears et al. ..... H04M 3/5233 379/265.02
7,103,172 B2 9/2006 Brown et al.
7,158,628 B2 1/2007 McConnell et al.
7,184,540 B2 2/2007 Dezonno et al.
7,209,549 B2 4/2007 Reynolds et al. .... H04M 3/493 379/265.01
7,231,032 B2 6/2007 Nevman et al.
7,231,034 B1 6/2007 Rikhy et al.
7,236,584 B2 6/2007 Torba
7,245,716 B2 7/2007 Brown et al.
7,245,719 B2 7/2007 Kawada et al.
7,266,251 B2 9/2007 Rowe
7,269,253 B1 9/2007 Wu et al.
7,398,224 B2 7/2008 Cooper ..... G06Q 10/06375 705/7.37
7,593,521 B2 9/2009 Becerra et al.
7,676,034 B1 * 3/2010 Wu ..... H04M 3/5233 379/265.01
7,725,339 B1 5/2010 Aykin
7,734,032 B1 6/2010 Kiefhaber et al.
7,826,597 B2 11/2010 Berner et al.
7,864,944 B2 1/2011 Khouri et al.
7,899,177 B1 3/2011 Bruening et al. ..... H04M 3/42068 379/265.01
7,916,858 B1 3/2011 Heller et al.
7,940,917 B2 5/2011 Lauridsen et al.
7,961,866 B1 6/2011 Boutcher et al. ... H04M 3/5232 379/265.01
7,995,717 B2 8/2011 Conway et al.
8,000,989 B1 8/2011 Kiefhaber et al.
8,010,607 B2 8/2011 McCormack et al.
8,094,790 B2 1/2012 Conway et al.
8,126,133 B1 * 2/2012 Everingham .. G06Q 10/063112 379/265.01
8,140,441 B2 3/2012 Cases et al. ..... G06Q 10/06 705/304
8,175,253 B2 5/2012 Knott et al.
8,229,102 B2 7/2012 Knott et al.
8,249,245 B2 8/2012 Jay et al.
8,295,471 B2 10/2012 Spottiswoode et al. ..... H04M 3/5237 379/265.06
8,300,798 B1 10/2012 Wu et al.
8,359,219 B2 * 1/2013 Chishti ..... H04M 3/5232 705/7.13
8,433,597 B2 * 4/2013 Chishti ..... H04M 3/5232 705/7.13
8,472,611 B2 * 6/2013 Chishti ..... H04M 3/5232 379/265.08
8,565,410 B2 * 10/2013 Chishti ..... H04M 3/5232 379/265.01
8,634,542 B2 * 1/2014 Spottiswoode ..... H04M 3/5232 379/265.13
8,644,490 B2 * 2/2014 Stewart ..... H04M 3/5232 379/265.02
8,670,548 B2 * 3/2014 Xie ..... H04M 3/5232 379/265.01
8,699,694 B2 * 4/2014 Chishti ..... H04M 3/5233 379/265.06
8,712,821 B2 * 4/2014 Spottiswoode ..... H04M 3/5232 705/7.29
8,718,271 B2 * 5/2014 Spottiswoode ..... H04M 3/5232 379/265.02
8,724,797 B2 * 5/2014 Chishti ..... H04M 3/5175 379/265.06
8,731,178 B2 * 5/2014 Chishti ..... H04M 3/5232 379/265.05
8,737,595 B2 * 5/2014 Chishti ..... H04M 3/5232 379/265.01

(56) References Cited

U.S. PATENT DOCUMENTS 8,750,488 B2 * 6/2014 Spottiswoode ..... H04M 3/5232 379/265.01
8,781,100 B2 * 7/2014 Spottiswoode ..... H04M 3/5232 379/265.06
8,781,106 B2 * 7/2014 Afzal ..... H04M 3/5232 379/265.01
8,792,630 B2 * 7/2014 Chishti ..... H04M 3/5232 379/265.01
8,824,658 B2 9/2014 Chishti
8,879,715 B2 * 11/2014 Spottiswoode ..... H04M 3/523 379/265.01
8,885,812 B2 * 11/2014 Margulies ..... G06Q 30/02 379/265.02
8,903,079 B2 * 12/2014 Xie ..... H04M 3/5232 379/265.11
8,929,537 B2 * 1/2015 Chishti ..... H04M 3/5232 379/265.01
8,995,647 B2 3/2015 Li et al.
9,020,137 B2 * 4/2015 Chishti ..... H04M 3/5232 379/265.05
9,025,757 B2 * 5/2015 Spottiswoode ..... H04M 3/5232 379/265.06
9,215,323 B2 * 12/2015 Chishti ..... H04M 3/5232
9,277,055 B2 * 3/2016 Spottiswoode ..... H04M 3/523
9,288,325 B2 * 3/2016 Chishti ..... H04M 3/5232
9,288,326 B2 * 3/2016 Chishti ..... H04M 3/5232
9,300,802 B1 * 3/2016 Chishti ..... H04M 3/5232
9,413,894 B2 * 8/2016 Chishti ..... H04M 3/5232
9,426,296 B2 * 8/2016 Chishti ..... H04M 3/5232
2001/0024497 A1 * 9/2001 Campbell ..... H04M 3/5125 379/265.09
2001/0032120 A1 10/2001 Stuart et al.
2002/0018554 A1 2/2002 Jensen et al.
2002/0046030 A1 4/2002 Harista et al. ..... G10L 17/26 704/255
2002/0059164 A1 5/2002 Shtivelman
2002/0082736 A1 6/2002 Lech et al.
2002/0110234 A1 8/2002 Walker et al.
2002/0111172 A1 8/2002 DeWolf et al.
2002/0131399 A1 9/2002 Philonenko
2002/0138285 A1 9/2002 DeCotiis et al.
2002/0143599 A1 10/2002 Nourbakhsh et al.
2002/0161765 A1 10/2002 Kundrot et al.
2002/0196845 A1 12/2002 Richards et al.
2003/0002653 A1 1/2003 Uckun
2003/0081757 A1 5/2003 Mengshoel et al. ..... H04M 3/5233 379/265.06
2003/0095652 A1 5/2003 Mengshoel et al.
2003/0169870 A1 9/2003 Stanford ..... H04M 3/5233 379/265.12
2003/0174830 A1 9/2003 Boyer et al.
2003/0217016 A1 11/2003 Pericle
2004/0028211 A1 2/2004 Culp et al.
2004/0057416 A1 3/2004 McCormack
2004/0096050 A1 5/2004 Das et al. ..... H04M 3/5233 379/265.12
2004/0098274 A1 5/2004 Dezonno et al.
2004/0101127 A1 5/2004 Dezonno et al. ..... H04M 3/523 379/265.02
2004/0109555 A1 6/2004 Williams ..... H04M 3/5232 379/265.02
2004/0133434 A1 7/2004 Szlam et al.
2004/0210475 A1 10/2004 Starnes et al.
2004/0230438 A1 11/2004 Pasquale et al.
2004/0267816 A1 12/2004 Russek
2005/0013428 A1 1/2005 Walters
2005/0043986 A1 2/2005 McConnell et al. ..... H04M 3/5232 379/265.02
2005/0047581 A1 3/2005 Shaffer et al.
2005/0047582 A1 3/2005 Shaffer et al.
2005/0129212 A1 6/2005 Parker
2005/0135593 A1 6/2005 Becerra et al.
2005/0135596 A1 6/2005 Zhao
2005/0187802 A1 * 8/2005 Koeppel ..... G06Q 30/02 705/4
2005/0195960 A1 9/2005 Shaffer et al.
2005/0286709 A1 12/2005 Horton et al.
2006/0062376 A1 * 3/2006 Pickford ..... H04M 3/5183 379/265.12
2006/0098803 A1 5/2006 Bushey et al. ..... H04M 3/5191 379/266.02
2006/0110052 A1 5/2006 Finlayson
2006/0124113 A1 6/2006 Roberts
2006/0184040 A1 8/2006 Keller et al.
2006/0222164 A1 10/2006 Contractor et al. ..... H04M 3/5232 379/265.05
2006/0233346 A1 10/2006 McIlwaine et al.
2006/0262918 A1 11/2006 Karnalkar et al.
2006/0262922 A1 11/2006 Margulies et al. .... G06Q 30/02 379/265.12
2007/0036323 A1 2/2007 Travis ..... H04M 3/5232 379/219
2007/0071222 A1 3/2007 Flockhart et al.
2007/0121602 A1 5/2007 Sin et al.
2007/0121829 A1 5/2007 Tal et al.
2007/0154007 A1 7/2007 Bernhard ..... H04M 3/5158 379/265.01
2007/0174111 A1 7/2007 Anderson et al.
2007/0198322 A1 8/2007 Bourne et al.
2007/0274502 A1 11/2007 Brown
2008/0002823 A1 1/2008 Fama et al.
2008/0008309 A1 1/2008 Dezonno et al. ... H04M 3/5232 379/265.02
2008/0046386 A1 2/2008 Pieraccinii et al.
2008/0065476 A1 3/2008 Klein et al.
2008/0118052 A1 5/2008 Houmaidi et al.
2008/0152122 A1 * 6/2008 Idan ..... H04M 3/5175 379/265.07
2008/0181389 A1 7/2008 Bourne et al.
2008/0199000 A1 8/2008 Su et al.
2008/0267386 A1 10/2008 Cooper
2008/0273687 A1 11/2008 Knott et al.
2009/0043670 A1 2/2009 Johansson et al.
2009/0086933 A1 4/2009 Patel et al. ..... G10L 17/26 379/52
2009/0190740 A1 7/2009 Chishti et al. ..... H04M 3/5232 379/265.06
2009/0190743 A1 7/2009 Spottiswoode ..... H04M 3/5232 379/265.11
2009/0190744 A1 7/2009 Xie et al. ..... H04M 3/5232 379/265.11
2009/0190745 A1 7/2009 Xie et al. ..... H04M 3/5232 379/265.11
2009/0190746 A1 7/2009 Chishti et al. ..... H04M 3/5232 379/265.12
2009/0190747 A1 7/2009 Spottiswoode ..... H04M 3/5232 379/265.12
2009/0190748 A1 7/2009 Chishti et al. ..... H04M 3/5232 379/265.13
2009/0190749 A1 7/2009 Xie et al. ..... H04M 3/5232 379/266.01
2009/0190750 A1 7/2009 Xie et al. ..... H04M 3/5232 379/266.03
2009/0232294 A1 * 9/2009 Xie ..... H04M 3/42068 379/265.1
2009/0234710 A1 9/2009 Belgaied Hassine et al.
2009/0245493 A1 10/2009 Chen et al.
2009/0304172 A1 12/2009 Becerra et al.
2009/0318111 A1 12/2009 Desai et al.
2009/0323921 A1 12/2009 Spottiswoode et al. ..... H04M 3/5232 379/265.12
2010/0020959 A1 1/2010 Spottiswoode ..... H04M 3/5232 379/265.1
2010/0020961 A1 1/2010 Spottiswoode ..... H04M 3/5232 379/265.12
2010/0054431 A1 3/2010 Jaiswal et al.

(56) References Cited

U.S. PATENT DOCUMENTS

| | | | | |
|---|---|---|---|---|
| 2010/0054452 | A1 | 3/2010 | Afzal | H04M 3/5232 379/265.11 |
| 2010/0054453 | A1 | 3/2010 | Stewart | H04M 3/5232 379/265.12 |
| 2010/0086120 | A1* | 4/2010 | Brussat | H04M 3/5233 379/265.12 |
| 2010/0111285 | A1 | 5/2010 | Chishti | |
| 2010/0111286 | A1 | 5/2010 | Chishti | |
| 2010/0111287 | A1* | 5/2010 | Xie | H04M 3/5232 379/265.13 |
| 2010/0111288 | A1 | 5/2010 | Afzal et al. | H04M 3/5232 379/265.14 |
| 2010/0142698 | A1* | 6/2010 | Spottiswoode | H04M 3/5232 379/265.11 |
| 2010/0183138 | A1 | 7/2010 | Spottiswoode et al. | |
| 2011/0022357 | A1 | 1/2011 | Vock et al. | |
| 2011/0031112 | A1 | 2/2011 | Birang et al. | |
| 2011/0069821 | A1 | 3/2011 | Korolev et al. | |
| 2011/0125048 | A1 | 5/2011 | Causevic et al. | |
| 2012/0051536 | A1* | 3/2012 | Chishti | H04M 3/5175 379/265.06 |
| 2012/0051537 | A1* | 3/2012 | Chishti | H04M 3/5233 379/265.11 |
| 2012/0224680 | A1* | 9/2012 | Spottiswoode | H04M 3/5232 379/265.12 |
| 2012/0278136 | A1 | 11/2012 | Flockhart et al. | |
| 2013/0003959 | A1 | 1/2013 | Nishikawa et al. | |
| 2013/0101109 | A1* | 4/2013 | Chishti | H04M 3/5232 379/265.1 |
| 2013/0216036 | A1* | 8/2013 | Chishti | H04M 3/5232 379/265.11 |
| 2013/0251137 | A1* | 9/2013 | Chishti | H04M 3/5232 379/265.11 |
| 2013/0251138 | A1* | 9/2013 | Spottiswoode | H04M 3/5232 379/265.12 |
| 2014/0044246 | A1 | 2/2014 | Klemm et al. | |
| 2014/0044255 | A1* | 2/2014 | Chishti | H04M 3/5232 379/265.12 |
| 2014/0079210 | A1 | 3/2014 | Kohler et al. | |
| 2014/0086402 | A1* | 3/2014 | Kan | H04M 3/5232 379/265.06 |
| 2014/0086403 | A1* | 3/2014 | Chishti | H04M 3/5232 379/265.11 |
| 2014/0086404 | A1* | 3/2014 | Chishti | H04M 3/5232 379/265.12 |
| 2014/0119531 | A1 | 5/2014 | Tuchman et al. | |
| 2014/0119533 | A1* | 5/2014 | Spottiswoode | H04M 3/523 379/265.11 |
| 2015/0055772 | A1 | 2/2015 | Klemm et al. | |
| 2015/0237208 | A1* | 8/2015 | Chishti | H04M 3/5232 379/265.11 |
| 2015/0237209 | A1* | 8/2015 | Chishti | H04M 3/5175 379/265.03 |
| 2015/0237211 | A1* | 8/2015 | Chishti | H04M 3/5238 379/265.11 |
| 2015/0237212 | A1* | 8/2015 | Chishti | H04M 3/5238 379/265.11 |
| 2015/0237213 | A1* | 8/2015 | Chishti | H04M 3/5236 379/265.14 |
| 2015/0264178 | A1* | 9/2015 | Chishti | H04M 3/5232 379/265.05 |
| 2015/0264179 | A1* | 9/2015 | Chishti | H04M 3/5232 379/265.11 |
| 2015/0271332 | A1* | 9/2015 | Spottiswoode | H04M 3/5232 379/265.14 |
| 2015/0304497 | A1* | 10/2015 | Spottiswoode | H04M 3/523 379/265.06 |
| 2015/0381810 | A1* | 12/2015 | Spottiswoode | H04M 3/523 379/265.09 |
| 2017/0064080 | A1* | 3/2017 | Chishti | H04M 3/5232 |
| 2017/0064081 | A1* | 3/2017 | Chishti | H04M 3/5232 |

FOREIGN PATENT DOCUMENTS

| | | | | |
|---|---|---|---|---|
| AU | 2009311534 | B2 | 8/2014 | |
| CN | 102301688 | B | 5/2014 | |
| CN | 102017591 | B | 11/2014 | |
| EP | 493292 | A2 * | 7/1992 | H04M 3/50 |
| EP | 0863651 | A2 | 9/1998 | |
| EP | 0949793 | A1 * | 10/1999 | H04M 3/50 |
| EP | 1032188 | A1 * | 8/2000 | H04M 3/523 |
| EP | 1107557 | A2 | 6/2001 | |
| JP | 11-098252 | A | 4/1999 | |
| JP | 2000-078291 | A | 3/2000 | |
| JP | 2000-078292 | A | 3/2000 | |
| JP | 2000-092213 | A | 3/2000 | |
| JP | 2000-236393 | A | 8/2000 | |
| JP | 2001-292236 | A | 10/2001 | |
| JP | 2001-518753 | A | 10/2001 | |
| JP | 2002-297900 | A | 10/2002 | |
| JP | 3366565 | B2 | 1/2003 | |
| JP | 2003-187061 | A | 7/2003 | |
| JP | 2004-056517 | A | 2/2004 | |
| JP | 2004-227228 | A | 8/2004 | |
| JP | 2006-345132 | A | 12/2006 | |
| JP | 2007-324708 | A | 12/2007 | |
| JP | 2011-511533 | A | 4/2011 | |
| JP | 2011-511536 | A | 4/2011 | |
| JP | 5421928 | B2 | 2/2014 | |
| JP | 5631326 | B2 | 11/2014 | |
| JP | 5649575 | B2 | 1/2015 | |
| NZ | 587100 | B | 10/2013 | |
| NZ | 587101 | B | 10/2013 | |
| NZ | 591486 | B | 1/2014 | |
| NZ | 592781 | B | 3/2014 | |
| PH | 1-2010-501704 | | 2/2014 | |
| PH | 1-2010-501705 | | 2/2015 | |
| WO | WO-1999/017517 | A1 | 4/1999 | |
| WO | WO 01/63894 | A2 * | 8/2001 | H04M 3/00 |
| WO | WO-01/63894 | A3 | 8/2001 | |
| WO | WO-2006/124113 | A2 | 11/2006 | |
| WO | WO 2009/097210 | A1 | 8/2009 | |
| WO | WO 2010/053701 | | 5/2010 | |
| WO | WO-2010/053701 | A2 | 5/2010 | |
| WO | WO-2011/081514 | A1 | 7/2011 | |

OTHER PUBLICATIONS

BusinessDictionary.com "Definition of Algorithm", downloaded from Internet Archive, Oct. 26, 2008. (Year: 2008).*

Anonymous. (2006) "Performance Based Routing in Profit Call Centers," The Decision Makers' Direct, located at www.decisioncraft.com, Issue Jan. 6, 2012 (3 pages).

Cleveland, William S., "Robust Locally Weighted Regression and Smoothing Scatterplots," Journal of the American Statistical Association, vol. 74, No. 368, pp. 829-836 (Dec. 1979).

European Office Action issued by the European Patent Office for Application No. 09752022.5 dated Dec. 18, 2015 (7 pages).

Gans, N. et al. (2003), "Telephone Call Centers: Tutorial, Review and Research Prospects," Manufacturing & Service Operations Management, vol. 5, No. 2, pp. 79-141.

International Preliminary Report on Patentability issued in connection with PCT Application No. PCT/US2009/066254 dated Jun. 14, 2011 (6 pages).

International Search Report issued in connection with International Application No. PCT/US13/33268 dated May 31, 2013 (2 pages).

International Search Report issued in connection with PCT/US2009/061537 dated Jun. 7, 2010 (5 pages).

International Search Report issued in connection with PCT/US2013/033261 dated Jun. 14, 2013 (3 pages).

International Search Report issued in connection with PCT/US2013/33265 dated Jul. 9, 2013 (2 pages).

Japanese Office Action issued by the Japan Patent Office for Application No. 2015-503396 dated Jun. 29, 2016 (7 pages).

Press, W. H. and Rybicki, G. B., "Fast Algorithm for Spectral Analysis of Unevenly Sampled Data," The Astrophysical Journal, vol. 338, pp. 277-280 (Mar. 1, 1989).

(56) References Cited

OTHER PUBLICATIONS

Stanley et al., "Improving call center operations using performance-based routing strategies," Calif. Journal of Operations Management, 6(1), 24-32, Feb. 2008; retrieved from http://userwww.sfsu.edu/saltzman/Publist.html.
Subsequent Substantive Examination Report issued in connection with Philippines Application No. 1-2010-501705 dated Jul. 14, 2014 (1 page).
Substantive Examination Report issued in connection with Philippines Application No. 1/2011/500868 dated May 2, 2014 (1 page).
Written Opinion of the International Searching Authority issued in connection with PCT Application No. PCT/US2008/077042 dated Mar. 13, 2009, 6 pages.
Written Opinion of the International Searching Authority issued in connection with International Application No. PCT/US13/33268 dated May 31, 2013, 7 pages.
Written Opinion of the International Searching Authority issued in connection with PCT/US2009/061537 dated Jun. 7, 2010, 10 pages.
Written Opinion of the International Searching Authority issued in connection with PCT/US2013/033261 dated Jun. 14, 2013, 7 pages.
Written Opinion of the International Searching Authority issued in connection with PCT/US2013/33265 dated Jul. 9, 2013, 7 pages.
Indian Office Action issued by the Government of India for Indian Application No. 3748/CHENP/2011 dated Feb. 1, 2018 (7 pages).
Anonymous. (2006). "Performance Based Routing in Profit Call Centers," *The Decision Makers' Direct,* located at www.decisioncraft.com, Issue 12/06/1, three pages.
Gans, N. et al. (2003). "Telephone Call Centers: Tutorial, Review and Research Prospects," Manuscript, pp. 1-81.
Koole, G. (2004). "Performance Analysis and Optimization in Customer Contact Centers," *Proceedings of the Quantitative Evaluation of Systems, First International Conference,* Sep. 27-30, 2004, four pages.
Koole, G. et al. (Mar. 6, 2006). "An Overview of Routing and Staffing Algorithms in Multi-Skill Customer Contact Centers," Manuscript, 42 pages.
Riedmiller, M. et al. (1993). "A Direct Adaptive Method for Faster Backpropagation Learning: The RPROP Algorithm," *1993 IEEE International Conference on Neural Networks,* San Francisco, CA, Mar. 28-Apr. 1, 1993, 1:586-591.
International Search Report mailed on Mar. 13, 2009, for PCT Application No. PCT/US2008/077042, filed on Sep. 19, 2008, 6 pages.
International Search Report mailed on Jun. 3, 2009, for PCT Application No. PCT/US2009/031611, filed on Jan. 21, 2009, 8 pages.
International Search Report mailed on Feb. 24, 2010, for PCT Application No. PCT/US2009/066254, filed on Dec. 1, 2009, 4 pages.
International Search Report mailed on Mar. 12, 2010, for PCT Application No. PCT/US2009/054352, filed on Aug. 19, 2009, 5 pages.
Written Opinion mailed on Mar. 13, 2009, for PCT Application No. PCT/US2008/077042, filed on Sep. 19, 2008, 6 pages.
Written Opinion mailed on Jun. 3, 2009, for PCT Application No. PCT/US2009/031611, filed on Jan. 21, 2009, 8 pages.
Written Opinion mailed on Feb. 24, 2010, for PCT Application No. PCT/US2009/066254, filed on Dec. 1, 2009, 6 pages.
Written Opinion mailed on Mar. 12, 2010, for PCT Application No. PCT/US2009/054352, filed on Aug. 19, 2009, 6 pages.
Office Action dated Dec. 31, 2012 issued in connection with U.S. Appl. No. 12/869,645.
Office Action dated Dec. 31, 2012 issued in connection with U.S. Appl. No. 12/869,654.
U.S. Appl. No. 12/266,415, filed Nov. 6, 2008, Afzal et al.
U.S. Appl. No. 12/266,418, filed Nov. 6, 2008, Xie et al.
U.S. Appl. No. 12/266,446, filed Nov. 6, 2008, Chishti.
U.S. Appl. No. 12/331,153, filed Dec. 9, 2008, Spottiswoode et al.
U.S. Appl. No. 12/355,602, filed Jan. 16, 2009, Xie et al.
U.S. Appl. No. 12/869,645, filed Aug. 26, 2010, Chishti et al.
U.S. Appl. No. 12/869,654, filed Aug. 26, 2010, Chishti et al.
U.S. Appl. No. 13/221,692, filed Aug. 30, 2011, Spottiswoode et al.
Notice of Allowance dated Jun. 29, 2012 issued in connection with U.S. Appl. No. 12/355,618.
Office Action dated Sep. 26, 2011 issued in connection with U.S. Appl. No. 12/355,618.
Office Action dated Feb. 3, 2012 issued in connection with U.S. Appl. No. 12/202,097.
Office Action dated Aug. 19, 2011 issued in connection with U.S. Appl. No. 12/202,097.
Office Action dated Feb. 3, 2012 issued in connection with U.S. Appl. No. 12/202,091.
Office Action dated Sep. 6, 2011 issued in connection with U.S. Appl. No. 12/202,091.
Office Action dated Oct. 7, 2011 issued in connection with U.S. Appl. No. 12/331,210.
Office Action dated Apr. 16, 2012 issued in connection with U.S. Appl. No. 12/331,210.
Office Action dated Apr. 18, 2012 issued in connection with U.S. Appl. No. 12/266,418.
Office Action dated Sep. 15, 2011 issued in connection with U.S. Appl. No. 12/266,418.
Office Action dated Oct. 29, 2012 issued in connection with U.S. Appl. No. 12/490,949.
Office Action dated Mar. 19, 2012 issued in connection with U.S. Appl. No. 12/490,949.
Office Action dated May 11, 2012 issued in connection with U.S. Appl. No. 12/331,195.
Office Action dated Oct. 7, 2011 issued in connection with U.S. Appl. No. 12/331,195.
Office Action dated Jan. 23, 2012 issued in connection with U.S. Appl. No. 12/331,186.
Office Action dated Aug. 19, 2011 issued in connection with U.S. Appl. No. 12/331,186.
Office Action dated Oct. 11, 2012 issued in connection with U.S. Appl. No. 12/267,459.
Office Action dated Mar. 2, 2012 issued in connection with U.S. Appl. No. 12/267,459.
Office Action dated Aug. 4, 2011 issued in connection with U.S. Appl. No. 12/267,459.
Office Action dated Mar. 30, 2012 issued in connection with U.S. Appl. No. 12/267,471.
Office Action dated Jun. 8, 2012 issued in connection with U.S. Appl. No. 12/266,446.
Office Action dated Sep. 12, 2011 issued in connection with U.S. Appl. No. 12/266,446.
Office Action dated Jun. 29, 2012 issued in connection with U.S. Appl. No. 12/331,153.
Office Action dated Sep. 26, 2011 issued in connection with U.S. Appl. No. 12/331,153.
Office Action dated Oct. 9, 2012 issued in connection with U.S. Appl. No. 12/202,101.
Office Action dated Mar. 15, 2012 issued in connection with U.S. Appl. No. 12/202,101.
Office Action dated Aug. 9, 2011 issued in connection with U.S. Appl. No. 12/202,101.
Office Action dated Jun. 7, 2012 issued in connection with U.S. Appl. No. 12/331,181.
Office Action dated Sep. 13, 2011 issued in connection with U.S. Appl. No. 12/331,181.
Office Action dated Apr. 6, 2012 issued in connection with U.S. Appl. No. 12/021,251.
Office Action dated Sep. 19, 2011 issued in connection with U.S. Appl. No. 12/021,251.
Notice of Allowance dated Sep. 19, 2012 issued in connection with U.S. Appl. No. 12/180,382.
Office Action dated Mar. 1, 2012 issued in connection with U.S. Appl. No. 12/180,382.
Office Action dated Aug. 23, 2011 issued in connection with U.S. Appl. No. 12/180,382.
Office Action dated Jun. 18, 2012 issued in connection with U.S. Appl. No. 12/331,201.

(56) References Cited

OTHER PUBLICATIONS

Office Action dated May 11, 2012 issued in connection with U.S. Appl. No. 12/266,415.
Office Action dated Jan. 19, 2012 issued in connection with U.S. Appl. No. 12/266,415.
Office Action dated Jun. 7, 2012 issued in connection with U.S. Appl. No. 12/355,602.
Office Action dated Sep. 23, 2011 issued in connection with U.S. Appl. No. 12/355,602.
International Search Report mailed Jul. 6, 2010 issued in connection with PCT/US2009/061537.
Written Opinion mailed Jul. 6, 2010 issued in connection with PCT/US2009/061537.
Office Action dated Aug. 31, 2012 issued in connection with Mexican Patent Application No. MX/a/2011/004815.

* cited by examiner

BALANCING MULTIPLE COMPUTER MODELS IN A CALL CENTER ROUTING SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*Note: More than one reissue patent application has been filed for the reissue of U.S. Pat. No. 8,472,611. The reissue patent applications are U.S. Reissue patent application Ser. No. 14/750,965, filed Jun. 25, 2015, and the present U.S. Reissue patent application Ser. No. 14/788,469, filed Jun. 30, 2015, which is a continuation reissue application of U.S. Reissue patent application Ser. No. 14/750,965, which is an application for reissue of U.S. Pat. No. 8,472,611.*

CROSS REFERENCE TO RELATED APPLICATION

This application is related to U.S. patent application Ser. No. 12/021,251, filed Jan. 28, 2008, which is hereby incorporated by reference in its entirety.

BACKGROUND

1. Field

The present invention relates generally to the field of routing phone calls and other telecommunications in a contact center system.

2. Related Art

The typical contact center consists of a number of human agents, with each assigned to a telecommunication device, such as a phone or a computer for conducting email or Internet chat sessions, that is connected to a central switch. Using these devices, the agents are generally used to provide sales, customer service, or technical support to the customers or prospective customers of a contact center or a contact center's clients.

Typically, a contact center or client will advertise to its customers, prospective customers, or other third parties a number of different contact numbers or addresses for a particular service, such as for billing questions or for technical support. The customers, prospective customers, or third parties seeking a particular service will then use this contact information, and the incoming caller will be routed at one or more routing points to a human agent at a contact center who can provide the appropriate service. Contact centers that respond to such incoming contacts are typically referred to as "inbound contact centers."

Similarly, a contact center can make outgoing contacts to current or prospective customers or third parties. Such contacts may be made to encourage sales of a product, provide technical support or billing information, survey consumer preferences, or to assist in collecting debts. Contact centers that make such outgoing contacts are referred to as "outbound contact centers."

In both inbound contact centers and outbound contact centers, the individuals (such as customers, prospective customers, survey participants, or other third parties) that interact with contact center agents using a telecommunication device are referred to in this application as a "caller."

The individuals acquired by the contact center to interact with callers are referred to in this application as an "agent."

Conventionally, a contact center operation includes a switch system that connects callers to agents. In an inbound contact center, these switches route incoming callers to a particular agent in a contact center, or, if multiple contact centers are deployed, to a particular contact center for further routing. In an outbound contact center employing telephone devices, dialers are typically employed in addition to a switch system. The dialer is used to automatically dial a phone number from a list of phone numbers, and to determine whether a live caller has been reached from the phone number called (as opposed to obtaining no answer, a busy signal, an error message, or an answering machine). When the dialer obtains a live caller, the switch system routes the caller to a particular agent in the contact center.

Routing technologies have accordingly been developed to optimize the caller experience. For example, U.S. Pat. No. 7,236,584 describes a telephone system for equalizing caller waiting times across multiple telephone switches, regardless of the general variations in performance that may exist among those switches. Contact routing in an inbound contact center, however, is a process that is generally structured to connect callers to agents that have been idle for the longest period of time. In the case of an inbound caller where only one agent may be available, that agent is generally selected for the caller without further analysis. In another example, if there are eight agents at a contact center, and seven are occupied with contacts, the switch will generally route the inbound caller to the one agent that is available. If all eight agents are occupied with contacts, the switch will typically put the contact on hold and then route it to the next agent that becomes available. More generally, the contact center will set up a queue of incoming callers and preferentially route the longest-waiting callers to the agents that become available over time. Such a pattern of routing contacts to either the first available agent or the longest-waiting agent is referred to as "round-robin" contact routing. In round robin contact routing, eventual matches and connections between a caller and an agent are essentially random.

Some attempts have been made to improve upon these standard yet essentially random processes for connecting a caller to an agent. For example, U.S. Pat. No. 7,209,549 describes a telephone routing system wherein an incoming caller's language preference is collected and used to route their telephone call to a particular contact center or agent that can provide service in that language. In this manner, language preference is the primary driver of matching and connecting a caller to an agent, although once such a preference has been made, callers are almost always routed in "round-robin" fashion.

BRIEF SUMMARY

Systems and methods of the present invention can be used to improve or optimize the routing of callers to agents in a contact center. According to one aspect of the present invention, a method for routing callers to agents in a call-center routing system includes using a multi-layer processing approach to matching a caller to an agent, where a first layer of processing includes two or more different computer models or methods for matching callers to agents. The output of the first layer, e.g., the output of the different methods for matching the callers to agents, is received by a second layer of processing for balancing or weighting the outputs and selecting a final caller-agent match for routing.

In one example, the two or more models or methods may include conventional queue based routing, performance based matching (e.g., ranking a set of agents based on performance and preferentially matching callers to the agents based on a performance ranking or score), pattern matching algorithms (e.g., comparing [agent] *caller* data associated with a set of callers to agent data associated *with* a set of agents and determining a suitability score of different caller-agent pairs), affinity data matching, and other models for matching callers to agents. The methods may therefore operate to output scores or rankings of the callers, agents, and/or caller-agent pairs for a desired optimization (e.g., for optimizing cost, revenue, customer satisfaction, and so on).

The output or scores of the two or more methods may be processed to select a caller-agent pair and cause the caller to be routed to a particular agent. For instance, the output of the two or more methods may be balanced or weighted against each other to determine a matching agent-caller pair. In one example, the output of the different methods may be balanced equally to determine routing instructions (e.g., the scores can be standardized and weighted evenly to determine a "best" matching agent-caller pair from the different methods). In other examples, the methods may be unbalanced, e.g., weighting a pattern matching algorithm output greater than a performance based routing output and so on.

Additionally, an interface may be presented to a user allowing for adjustment of the balancing of the methods, e.g., a slider or selector for adjusting the balance in real-time or a predetermined time. The interface may allow a user to turn certain methods on and off, change desired optimizations, and may display an estimated effect of the balancing or a change in balancing of the different routing methods.

In some examples, an adaptive algorithm (such as a neural network or genetic algorithm) may be used to receive, as input, the outputs of the two or more models to output a caller-agent pair. The adaptive algorithm may compare performance over time and adapt to pick the best model for a desired outcome variable.

According to another aspect, apparatus is provided comprising logic for mapping and routing callers to agents. The apparatus may include logic for receiving input data associated with callers and agents at a first layer of processing, the first layer of processing including at least two models for matching callers to agents, each model outputting output data for at least one caller-agent pair. The apparatus may further include logic for receiving the output data from each processing model at a second layer of processing, the second layer of processing operable to balance the output data of the at least two models and map a caller to an agent based on the received outputs.

Many of the techniques described here may be implemented in hardware, firmware, software, or combinations thereof. In one example, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices. Moreover, each program is preferably implemented in a high level procedural or object-oriented programming language to communicate with a computer system. However, the programs can be implemented in assembly or machine language, if desired. In any case, the language may be a compiled or interpreted language.

DETAILED DESCRIPTION OF THE INVENTION

Figure 1:
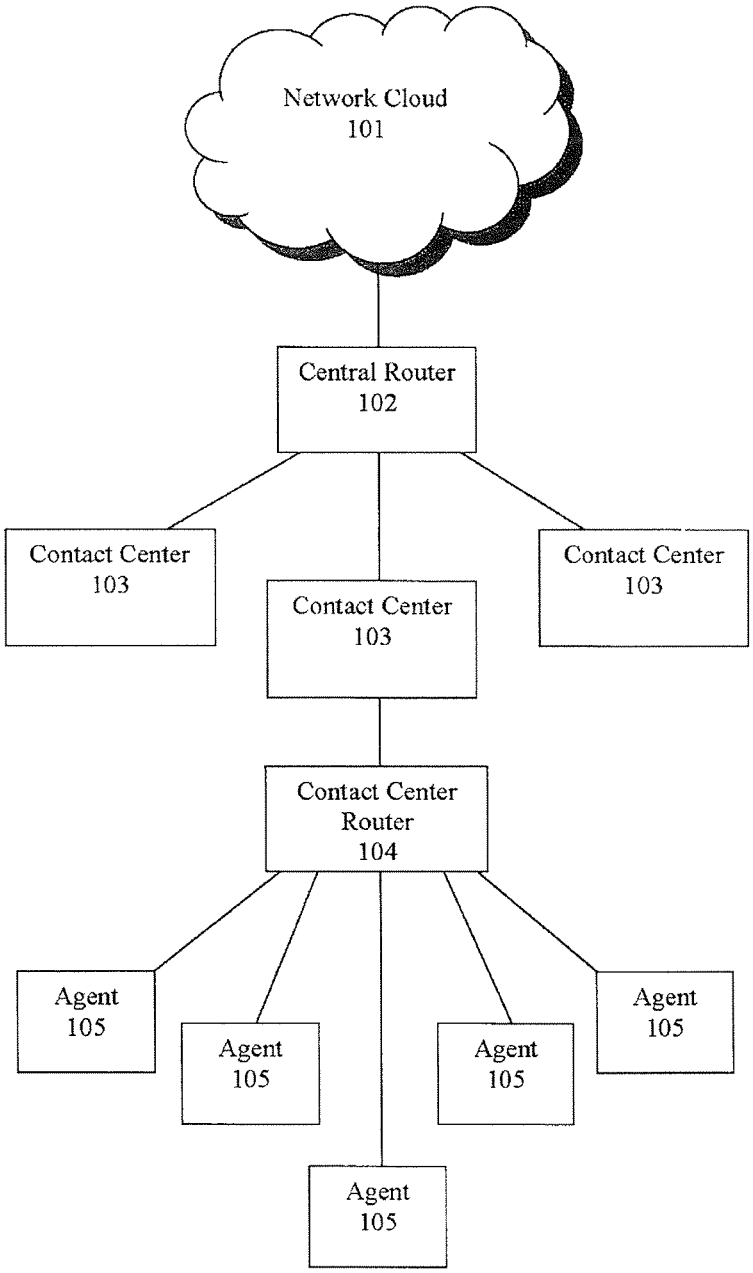
FIG. 1 is a diagram reflecting the general setup of a contact center operation.

The following description is presented to enable a person of ordinary skill in the art to make and use the invention, and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hardwired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

According to one aspect of the present invention systems, methods, and displayed computer interfaces are provided for routing callers to agents within a call center. In one example, a method includes using a first layer of processing, the first layer including two or more methods or models for determining caller-agent pairs. For example, the two or more methods may include conventional queue based routing, performance based matching (e.g., ranking a set of agents based on performance and preferentially matching callers to the agents based on a performance ranking or score), pattern matching algorithms (e.g., comparing agent data associated with a set of callers to agent data associated a set of agents and determine a suitability score of different caller-agent pairs), affinity data matching, and other models for matching callers to agents. The methods may therefore operate to output scores or rankings of the callers, agents, and/or caller-agent pairs for a desired optimization (e.g., for optimizing cost, revenue, customer satisfaction, and so on) to a second layer of processing. The second layer of processing may receive the output of the first layer and determine an agent-caller pair based on the output of different methods of the first layer of processing. In one example, the second layer of processing includes a computer model to balance or weight the different outputs, which may be altered by a user.

Initially, exemplary call routing systems and methods utilizing performance and/or pattern matching algorithms (either of which may be used within generated computer models for predicting the chances of desired outcomes) are described for routing callers to available agents. This description is followed by exemplary systems and methods for multi-layer processing of input data to select a caller-agent pairing.

FIG. 1 is a diagram reflecting the general setup of a contact center operation 100. The network cloud 101 reflects a specific or regional telecommunications network designed to receive incoming callers or to support contacts made to outgoing callers. The network cloud 101 can comprise a single contact address, such as a telephone number or email address, or multiple contract addresses. The central router 102 reflects contact routing hardware and software designed to help route contacts among call centers 103. The central router 102 may not be needed where there is only a single contact center deployed. Where multiple contact centers are deployed, more routers may be needed to route contacts to another router for a specific contact center 103. At the contact center level 103, a contact center router 104 will route a contact to an agent 105 with an individual telephone or other telecommunications equipment 105. Typically, there are multiple agents 105 at a contact center 103, though there are certainly embodiments where only one agent 105 is at the contact center 103, in which case a contact center router 104 may prove to be unnecessary.

Figure 2:
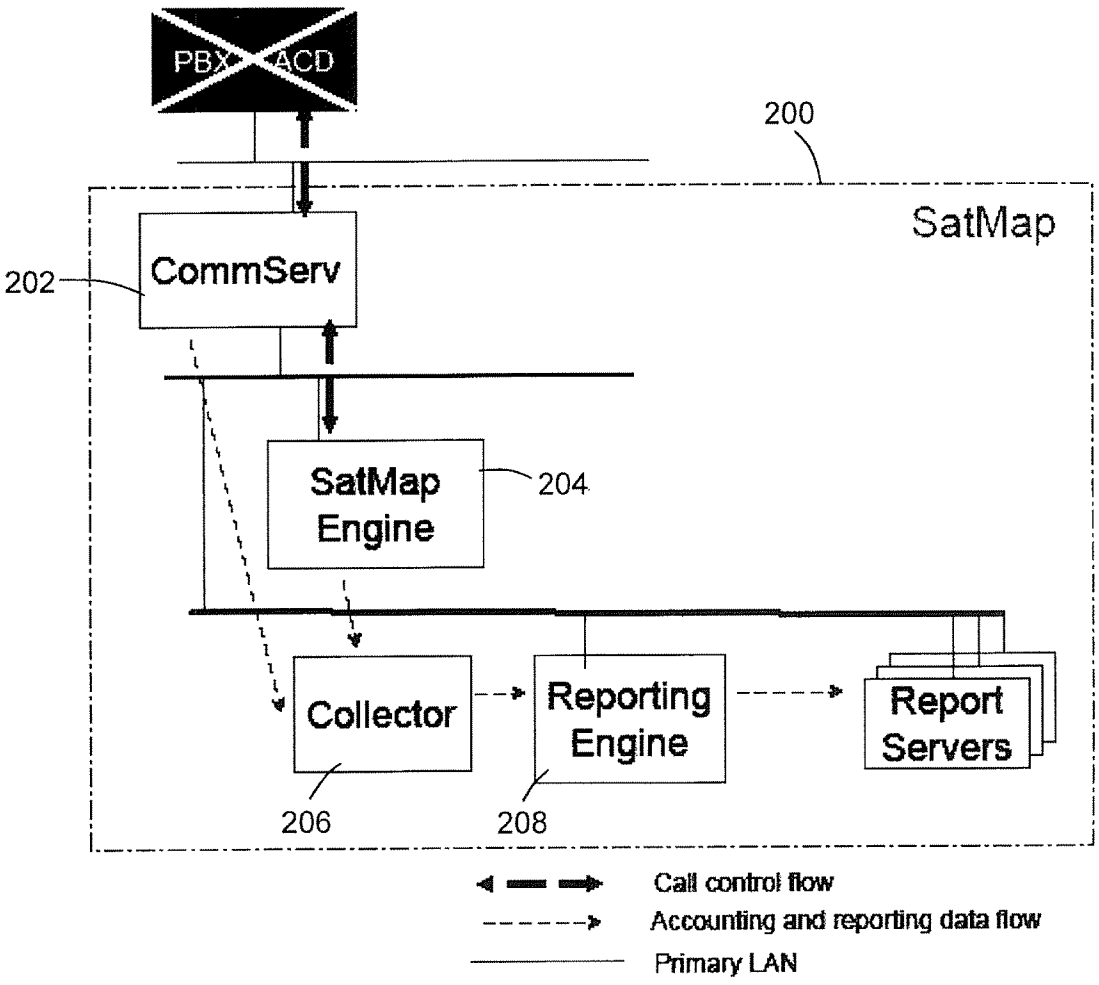
FIG. 2 illustrates an exemplary routing system having a routing engine for routing callers based on performance and/or pattern matching algorithms.

FIG. 2 illustrates an exemplary contact center routing system 200 (which may be included with contact center router 104 of FIG. 1). Broadly speaking, routing system 200 is operable to match callers and agents based, at least in part, on agent performance or pattern matching algorithms using caller data and/or agent data. Routing system 200 may include a communication server 202 and a routing engine 204 (referred to at times as "SatMap" or "Satisfaction Mapping") for receiving and matching callers to agents (referred to at times as "mapping" callers to agents).

Routing engine 204 may operate in various manners to match callers to agents based on performance data of agents, pattern matching algorithms, and computer models, which may adapt over time based on the performance or outcomes of previous caller-agent matches. In one example, the routing engine 204 includes a neural network based adaptive pattern matching engine. Various other exemplary pattern matching and computer model systems and methods which may be included with content routing system and/or routing engine 204 are described, for example, in U.S. Ser. No. 12/021,251, filed Jan. 28, 2008, and U.S. Ser. No. U.S. patent application Ser. No. 12/202,091, filed Aug. 29, 2008, both of which are hereby incorporated by reference in their entirety. Of course, it will be recognized that other performance based or pattern matching algorithms and methods may be used alone or in combination with those described here.

Routing system 200 may further include other components such as collector 206 for collecting caller data of incoming callers, data regarding caller-agent pairs, outcomes of caller-agent pairs, agent data of agents, and the like. Further, routing system 200 may include a reporting engine 208 for generating reports of performance and operation of routing system 200. Various other servers, components, and functionality are possible for inclusion with routing system 200. Further, although shown as a single hardware device, it will be appreciated that various components may be located remotely from each other (e.g., communication server 202 and routing engine 204 need not be included with a common hardware/server system or included at a common location). Additionally, various other components and functionality may be included with routing system 200, but have been omitted here for clarity.

Figure 3:
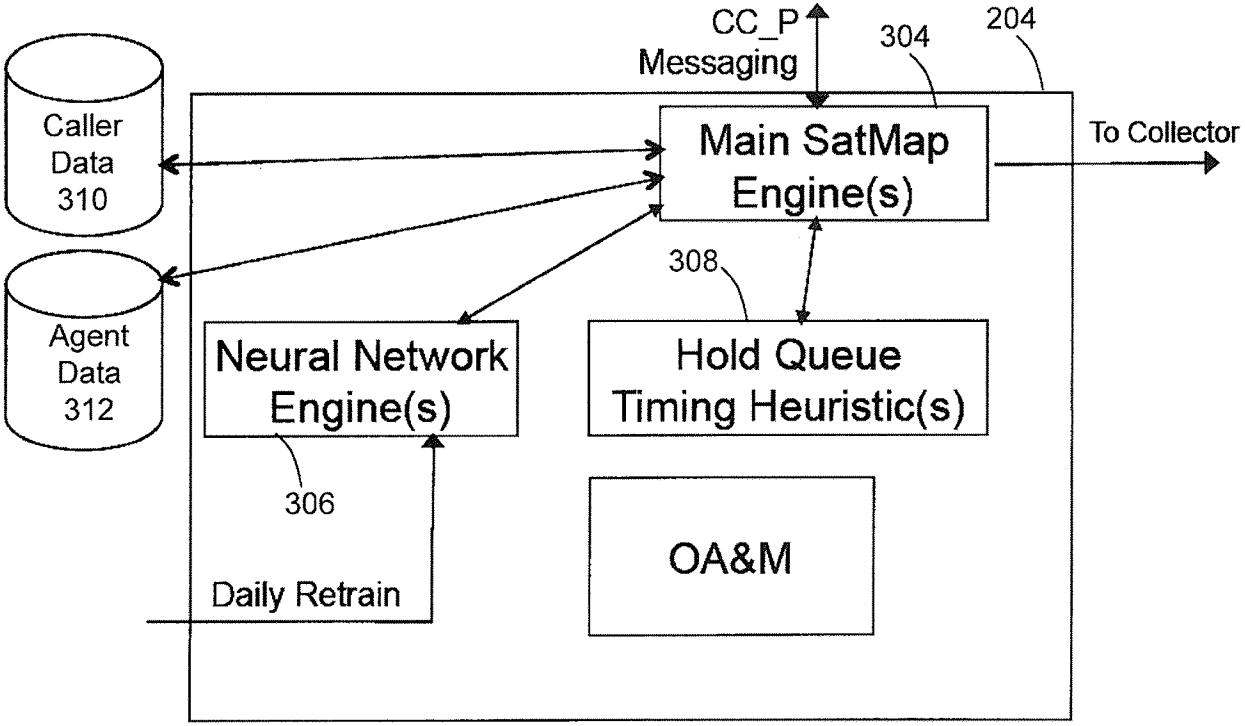
FIG. 3 illustrates an exemplary routing system having a mapping engine for routing callers based on performance and/or pattern matching algorithms.

FIG. 3 illustrates detail of exemplary routing engine 204. Routing engine 204 includes a main mapping engine 304, which receives caller data and agent data from databases 310 and 312. In some examples, routing engine 204 may route callers based solely or in part on performance data associated with agents. In other examples, routing engine 204 may make routing decisions based solely or in part on comparing various caller data and agent data, which may include, e.g., performance based data, demographic data, psychographic data, and other business-relevant data. Additionally, affinity databases (not shown) may be used and such information received by routing engine 204 for making routing decisions.

In one example, routing engine 204 includes or is in communication with one or more neural network engines 306. Neural network engines 306 may receive caller and agent data directly or via routing engine 204 and operate to match and route callers based on pattern matching algorithms and computer models generated to increase the changes of desired outcomes. Further, as indicated in FIG. 3, call history data (including, e.g., caller-agent pair outcomes with respect to cost, revenue, customer satisfaction, etc.) may be used to retrain or modify the neural network engine 306.

Routing engine 204 further includes or is in communication with hold queue 308, which may store or access hold or idle times of callers and agents, and operates to map callers to agents based on queue order of the callers (and/or agents). Mapping engine 304 may operate, for example, to map callers based on a pattern matching algorithm, e.g., as included with neural network engine 306, or based on queue order, e.g., as retrieved from hold queue 308.

Figure 4:
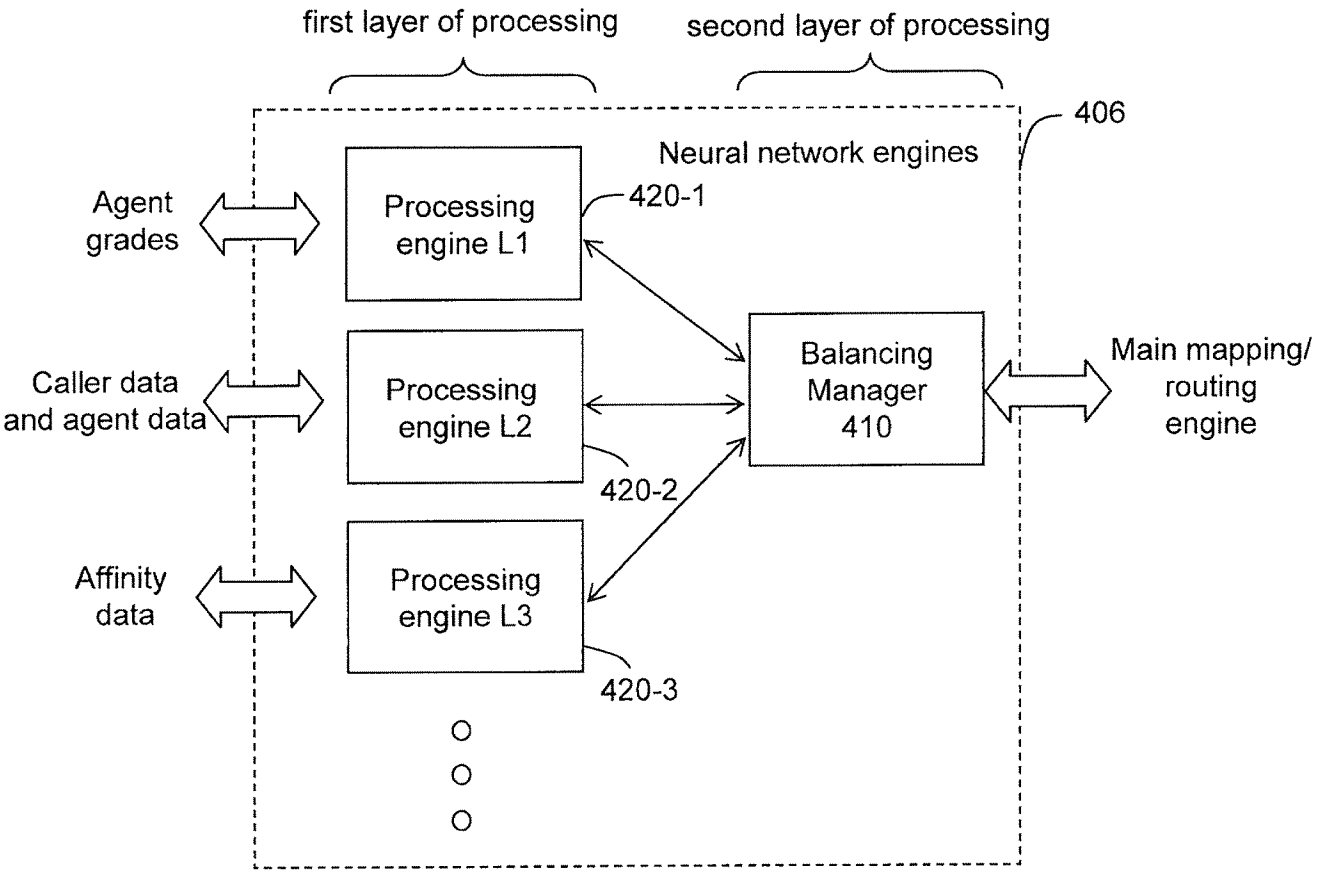
FIG. 4 illustrates an exemplary multi-layer approach to selecting a caller-agent pair based on multiple matching methods.

FIG. 4 illustrates an exemplary mapping system 406. Mapping system 406 includes two layers of processing - a first layer includes at least two processing engines or computer models as indicated by 420-1, 420-2, and 420-3. The processing engines 420-1, 420-2, and 420-3 may each operate on different data and/or according to a different model or method for matching callers to agents. In this particular example, processing engine 420-1 may receive agent grade data, e.g., data associated with agent performance for a particular desired performance. As will be described in further detail with respect to FIG. 7 below, performance based routing may include ranking or scoring a set of agents based on performance for a particular outcome (such as revenue generation, cost, customer satisfaction, combinations thereof, and the like) and preferentially routing callers to agents based on a performance ranking or score. Accordingly, processing engine 420-1 may receive agent grades or agent history data and output one or more rankings of agents based on one or more desired outcome variables.

Processing engine 420-2, in this example, includes one or more pattern matching algorithms, which may operate to compare agent data associated with a set of callers to agent data associated a set of agents and determine a suitability score of each caller-agent pair. Processing engine 420-2 may receive caller data and agent data from various databases and output caller-agent pair scores or a ranking of caller-agent pairs, for example. The pattern matching algorithm may include a neural network algorithm, genetic algorithm, or other adaptive algorithms. Further, in some examples, different processing engines may be used with different pattern matching algorithms operating on the same or different input data, e.g., a first processing engine utilizing a neural network algorithm and a second processing engine utilizing a different algorithm such as a genetic algorithm or other pattern matching algorithm. Additionally, first and second processing engines may include similar pattern matching algorithms operable to maximize different output variables; for example, a first neural network algorithm operable to maximize revenue and a second neural network algorithm operable to maximize customer satisfaction.

Processing engine 420-3, in this example, includes one or more affinity matching algorithms, which operate to receive affinity data associated with the callers and/or agents. Processing engine 420-3 may receive affinity data from various databases and output caller-agent pairs or a ranking of caller-agent pairs based, at least in part, on the affinity data. It should be noted that various other methods or models may be used in the first layer of processing, and further that the first layer of processing may include multiple sub-layers of processing (e.g., processing engine 420-1 outputting to processing engine 420-2 and so on). Further, in some examples a processing engine may include conventional queue based routing, e.g., routing agents and callers based on queue order.

As described, the processing engines 420-1, 420-2, and 420-3 each output scores or rankings of the callers, agents, and/or caller-agent pairs for a desired optimization (e.g., for optimizing cost, revenue, customer satisfaction, and so on). The output or scores of the two or more methods may then be processed by balancing manager 410, e.g., at the second level of processing, to select a caller-agent pair. For instance, the output of processing engines 420-1, 420-2, and 420-3 is received by balancing manager 410 and may be weighted against each other to determine a matching agent-caller pair. In one example, the outputs of processing engines 420-1, 420-2, and 420-3 are balanced equally to determine routing instructions (e.g., the scores can be standardized and weighted evenly to determine a "best" matching agent-caller pair). In other examples, the methods may be unbalanced, e.g., weighting a pattern matching algorithm method output greater than a performance based routing method, turning certain processing engines "off", and so on.

Additionally, an interface may be presented to a user allowing for adjustment of balancing manager 410, e.g., a slider or selector for adjusting the balance of the processing engines in real-time or at a predetermined time. Additionally, the interface may allow a user to turn certain methods on and off, and may display an estimated effect of the balancing or a change in the balancing. For instance, an interface may display the probable change in one or more of cost, revenue generation, or customer satisfaction by changing the operation of balancing manager 410. Various estimation methods and algorithms for estimating outcome variables are described, for example, in copending U.S. provisional Patent application Ser. No. 61/084,201, filed on Jul. 28, 2008, and which is incorporated herein by reference in its entirety. In one example, the estimate includes evaluating a past time period of the same (or similar) set of agents and constructing a distribution of agent/caller pairs. Using each pair, an expected success rate can be computed via the performance based matching, pattern matching algorithm, etc., and applied to current information to estimate current performance (e.g., with respect to one or more of sales, cost, customer satisfaction, etc.). Accordingly, taking historical call data and agent information the system can compute estimates of changing the balance or weighting of the level one processing methods. It is noted that a comparable time (e.g., time of day, day of the week etc.) for the historical information may be important as performance will likely vary with time.

In some examples, balancing manager 410 may include an adaptive algorithm (such as a neural network or genetic algorithm) for receiving, as input, the outputs of the two or more models to output a caller-agent pair. Accordingly, balancing manger 410 via an adaptive algorithm may compare performance over time and adapt to pick or weight the level one processing engines to increase the chances of a desired outcome.

Figure 5:
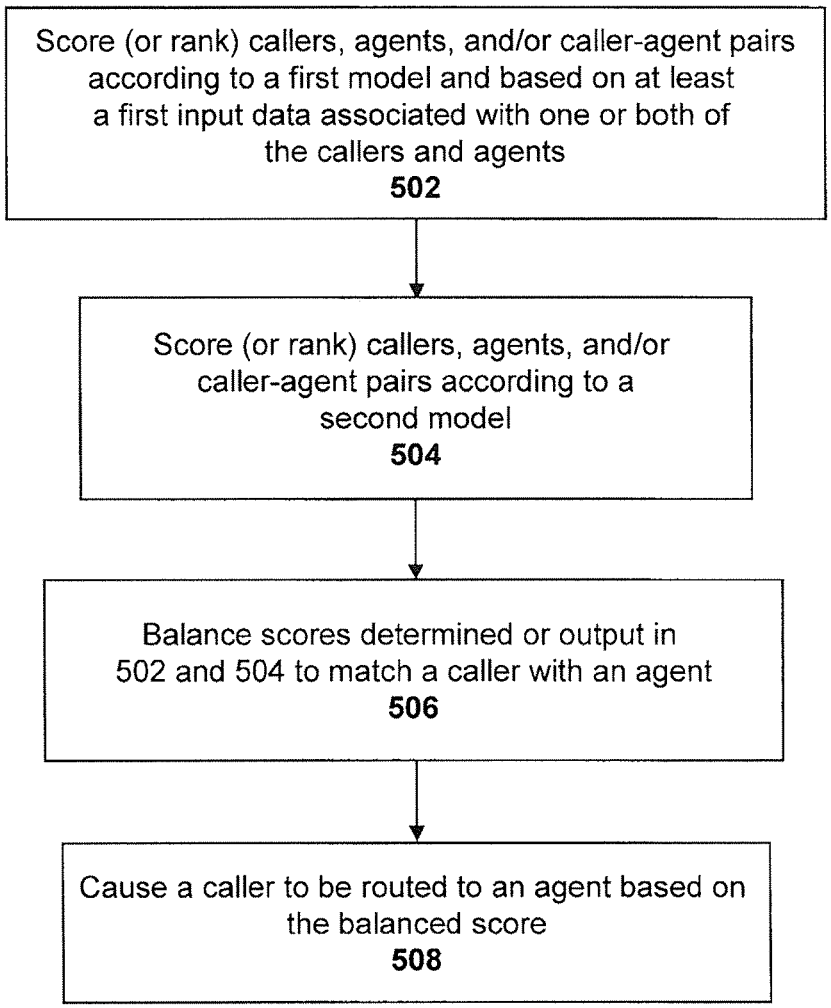
FIG. 5 illustrates an exemplary method for scoring or ranking agents, callers, and/or agent-caller pairs according to at least two different methods and matching a caller to an agent based on a balancing of the at least two different methods.

FIG. 5 illustrates an exemplary method for scoring or ranking agents, callers, and/or agent-caller pairs according to at least two different computer models or methods and matching a caller to an agent based on a balancing of the at least two different models. In this example, a caller, agent, or caller-agent pair is scored based on at least first input data at 502. The input data may include agent performance grades, caller data and/or agent data, queue order of the callers and agents, combinations thereof, and so on. Further, the score may include a raw score, normalized score, ranking relative to other callers, agents, and/or caller-agent pairs, and so on.

The method further includes scoring callers, agents, or caller-agent pairs at 504 according to a second model for mapping callers to agents, the second model different than the first model. Note, however, the second model may use some or all of the same first input data as used in 502 or may rely on different input data, e.g., at least a second input data. Similarly, the scoring may include a raw score, normalized score, ranking relative to other callers, agents, and/or caller-agent pairs, and so on.

The scores determined in 502 and 504 may be balanced at 506 to determine routing instructions for a caller. The balancing may include weighting scores from 502 and 504 equally or unequally, and may be adjusted over time by a user or in response to adaptive feedback of the system. It will also be recognized that the scores output from 502 and 504 may be normalized in any suitable fashion, e.g., computing a Z-score or the like as described in co-pending U.S. patent application Ser. No. 12/202,091, filed on Aug. 29, 2008, which is incorporated herein by reference in its entirety.

The final selection or mapping of a caller to an agent may then be passed to a routing engine or router for causing the caller to be routed to the agent at 508. It is noted that the described actions do not need to occur in the order in which they are stated and some acts may be performed in parallel (for example, the first layer processing of 502 and 504 may be performed partially or wholly in parallel). Further, additional models for scoring and mapping callers to agents may be used and output to the balancing at 506 for determining a final selection of a caller-agent pair.

Figure 6:
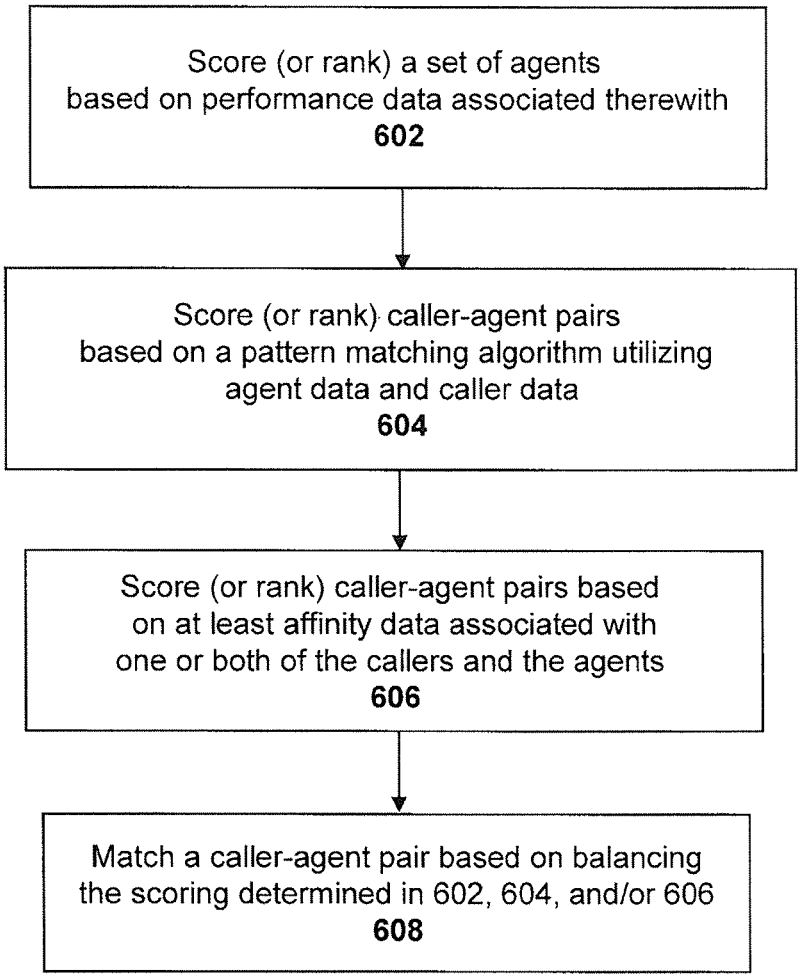
FIG. 6 illustrates another exemplary method for scoring or ranking agents, callers, and/or agent-caller pairs according to at least two different methods and matching a caller to an agent based on a balancing of the at least two different methods.

FIG. 6 illustrates another exemplary method for scoring or ranking agents, callers, and/or agent-caller pairs according to at least two different methods and matching a caller to an agent based on a balancing of the at least two different methods. In this particular example, a first model operates to score a set of agents based on performance at 602, and may output a ranking or score associated with the performance of the agents. Such a method for ranking agents based on performance is described in greater detail with respect to FIG. 7 below.

The method further includes scoring caller-agent pairs at 604 according to a second model for mapping callers to agents, in particular, according to a pattern matching algorithm. The pattern matching algorithm may include comparing caller data and agent data for each caller-agent pair and computing a suitability score or ranking of caller-agent pairs for a desired outcome variable (or weighting of outcome variables). Such a pattern matching algorithm is described in greater detail with respect to FIG. 8 below, and may include a neural network algorithm.

The method further includes scoring caller-agent pairs at 606 according to a third model for mapping callers to agents based on affinity data. The use of affinity data and affinity databases alone or in combination with pattern matching algorithms is described in greater detail below.

The scores (or rankings) determined in 602, 604, and 606 may be balanced at 608 to determine the routing instructions for a caller. The balancing may include weighting scores from 602, 604, and 606 equally or unequally, and may be adjusted by a user or in response to adaptive feedback of the system. It will also be recognized that the scores output from 602, 604, and 60 may be normalized in any suitable fashion as described with respect to FIG. 5.

The final selection or mapping of a caller to an agent may then be passed to a routing engine or router for causing the caller to be routed to the agent. It is again noted that the described actions do not need to occur in the order in which they are stated and some acts may be performed in parallel (for example, the first layer processing of 602, 604, and 606 may be performed partially or wholly in parallel). Further, additional (or fewer) matching models for scoring and mapping callers to agents may be used and output to the balancing at 608 for determining a final selection of a caller-agent pair.

Figure 7:
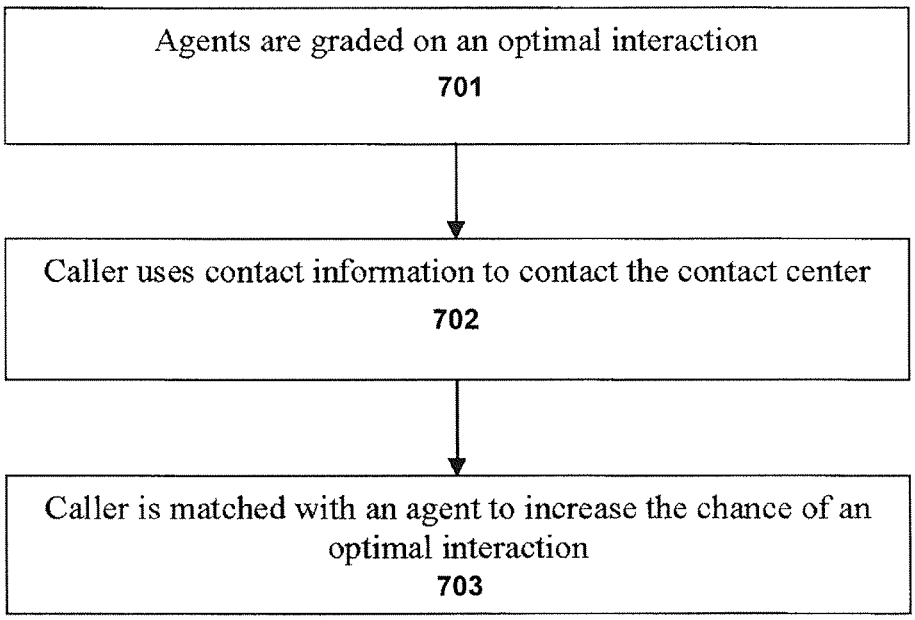
FIG. 7 illustrates an exemplary method or computer model for matching callers to agents based on performance.

FIG. 7 illustrates a flowchart of an exemplary method or model for matching callers to agents based on performance. The method includes grading two agents on an optimal interaction and matching a caller with at least one of the two graded agents to increase the chance of the optimal interaction. At the initial block 701, agents are graded on an optimal interaction, such as increasing revenue, decreasing costs, or increasing customer satisfaction. Grading can be accomplished by collating the performance of a contact center agent over a period of time on their ability to achieve an optimal interaction, such as a period of at least 10 days. However, the period of time can be as short as the immediately prior contact to a period extending as long as the agent's first interaction with a caller. Moreover, the method of grading agent can be as simple as ranking each agent on a scale of 1 to N for a particular optimal interaction, with N being the total number of agents. The method of grading can also comprise determining the average contact handle time of each agent to grade the agents on cost, determining the total sales revenue or number of sales generated by each agent to grade the agents on sales, or conducting customer surveys at the end of contacts with callers to grade the agents on customer satisfaction. The foregoing, however, are only examples of how agents may be graded; many other methods may be used.

Figure 8:
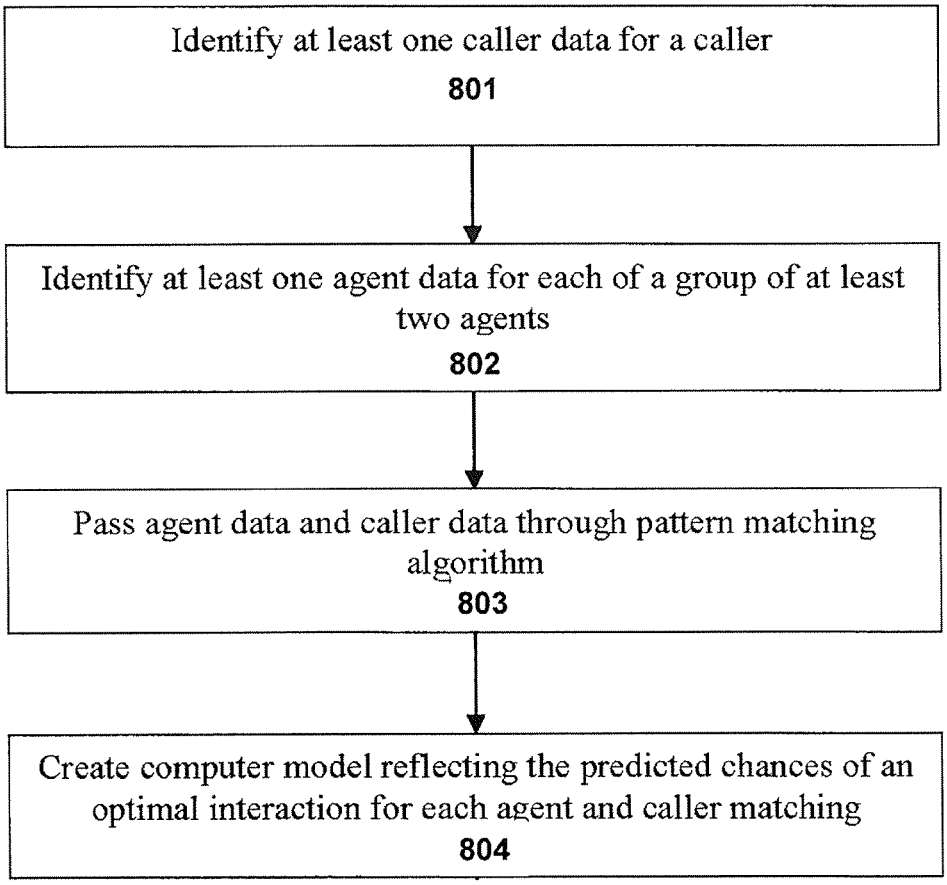
FIG. 8 illustrates an exemplary method or computer model for matching callers to agents based on caller data and agent data.

At block 702 a caller uses contact information, such as a telephone number or email address, to initiate a contact with the contact center. At block 703, the caller is matched with an agent or group of agents such that the chance of an optimal interaction is increased, as opposed to just using the round robin matching methods of the prior art. The method may further include grading a group of at least two agents on two optimal interactions, weighting one optimal interaction against another optional interaction, and matching the caller with one of the two graded agents to increase the chance of a more heavily-weighted optimal interaction. In particular, agents may be graded on two or more optimal interactions, such as increasing revenue, decreasing costs, or increasing customer satisfaction, which may then be weighted against each other. The weighting can be as simple as assigning to each optimal interaction a percentage weight factor, with all such factors totaling to 100 percent. Any comparative weighting method can be used, however. The weightings placed on the various optimal interactions can take place in real-time in a manner controlled by the contact center, its clients, or in line with pre-determined rules. Optionally, the contact center or its clients may control the weighting over the internet or some another data transfer system. As an example, a client of the contact center could access the weightings currently in use over an internet browser and modify these remotely. Such a modification may be set to take immediate effect and, immediately after such a modification, subsequent caller routings occur in line with the newly establishing weightings. An instance of such an example may arise in a case where a contact center client decides that the most important strategic priority in their business at present is the maximization of revenues. In such a case, the client would remotely set the weightings to favor the selection of agents that would generate the greatest probability of a sale in a given contact. Subsequently the client may take the view that maximization of customer satisfaction is more important for their business. In this event, they can remotely set the weightings of the present invention such that callers are routed to agents most likely to maximize their level of satisfaction. Alternatively the change in weighting may be set to take effect at a subsequent time, for instance, commencing the following morning FIG. 8 illustrate another exemplary model or method for matching a caller to an agent, and which may combine agent grades, agent demographic data, agent psychographic data, and other business-relevant data about the agent (individually or collectively referred to in this application as "agent data"), along with demographic, psychographic, and other business-relevant data about callers (individually or collectively referred to in this application as "caller data"). Agent and caller demographic data can comprise any of: gender, race, age, education, accent, income, nationality, ethnicity, area code, zip code, marital status, job status, and credit score. Agent and caller psychographic data can comprise any of introversion, sociability, desire for financial success, and film and television preferences. It will be appreciated that the acts outlined in the flowchart of FIG. 8 need not occur in that exact order.

This exemplary model or method includes determining at least one caller data for a caller, determining at least one agent data for each of two agents, using the agent data and the caller data in a pattern matching algorithm, and matching the caller to one of the two agents to increase the chance of an optimal interaction. At 801, at least one caller data (such as a caller demographic or psychographic data) is determined. One way of accomplishing this is by retrieving this from available databases by using the caller's contact information as an index. Available databases include, but are not limited to, those that are publicly available, those that are commercially available, or those created by a contact center or a contact center client. In an outbound contact center environment, the caller's contact information is known beforehand. In an inbound contact center environment, the caller's contact information can be retrieved by examining the caller's CallerID information or by requesting this information of the caller at the outset of the contact, such as through entry of a caller account number or other caller-identifying information. Other business-relevant data such as historic purchase behavior, current level of satisfaction as a customer, or volunteered level of interest in a product may also be retrieved from available databases.

At 802, at least one agent data for each of two agents is determined. One method of determining agent demographic or psychographic data can involve surveying agents at the time of their employment or periodically throughout their employment. Such a survey process can be manual, such as through a paper or oral survey, or automated with the survey being conducted over a computer system, such as by deployment over a web-browser.

Though this advanced embodiment preferably uses agent grades, demographic, psychographic, and other business-relevant data, along with caller demographic, psychographic, and other business-relevant data, other embodiments of the present invention can eliminate one or more types or categories of caller or agent data to minimize the computing power or storage necessary to employ the present invention.

Once agent data and caller data have been collected, this data is passed to a computational system. The computational system then, in turn, uses this data in a pattern matching algorithm at 803 to create a computer model that matches each agent with the caller and estimates the probable outcome of each matching along a number of optimal interactions, such as the generation of a sale, the duration of contact, or the likelihood of generating an interaction that a customer finds satisfying.

The pattern matching algorithm to be used in the present invention can comprise any correlation algorithm, such as a neural network algorithm or a genetic algorithm. To generally train or otherwise refine the algorithm, actual contact results (as measured for an optimal interaction) are compared against the actual agent and caller data for each contact that occurred. The pattern matching algorithm can then learn, or improve its learning of, how matching certain callers with certain agents will change the chance of an optimal interaction. In this manner, the pattern matching algorithm can then be used to predict the chance of an optimal interaction in the context of matching a caller with a particular set of caller data, with an agent of a particular set of agent data. Preferably, the pattern matching algorithm is periodically refined as more actual data on caller interactions becomes available to it, such as periodically training the algorithm every night after a contact center has finished operating for the day.

At 804, the pattern matching algorithm is used to create a computer model reflecting the predicted chances of an optimal interaction for each agent and caller matching. Preferably, the computer model will comprise the predicted chances for a set of optimal interactions for every agent that is logged in to the contact center as matched against every available caller. Alternatively, the computer model can comprise subsets of these, or sets containing the aforementioned sets. For example, instead of matching every agent logged into the contact center with every available caller, the present invention can match every available agent with every available caller, or even a narrower subset of agents or callers. Likewise, the present invention can match every agent that ever worked on a particular campaign—whether available or logged in or not—with every available caller. Similarly, the computer model can comprise predicted chances for one optimal interaction or a number of optimal interactions.

The computer model can also be further refined to comprise a suitability score for each matching of an agent and a caller. The suitability score can be determined by taking the chances of a set of optimal interactions as predicted by the pattern matching algorithm, and weighting those chances to place more or less emphasis on a particular optimal interaction as related to another optimal interaction. The suitability score can then be used in the present invention to determine which agents should be connected to which callers.

In other examples, exemplary models or methods may utilize affinity data associated with callers and/or agents. For example, affinity data may relate to an individual caller's contact outcomes (referred to in this application as "caller affinity data"), independent of their demographic, psychographic, or other business-relevant information. Such caller affinity data can include the caller's purchase history, contact time history, or customer satisfaction history. These histories can be general, such as the caller's general history for purchasing products, average contact time with an agent, or average customer satisfaction ratings. These histories can also be agent specific, such as the caller's purchase, contact time, or customer satisfaction history when connected to a particular agent.

As an example, a certain caller may be identified by their caller affinity data as one highly likely to make a purchase, because in the last several instances in which the caller was contacted, the caller elected to purchase a product or service. This purchase history can then be used to appropriately refine matches such that the caller is preferentially matched with an agent deemed suitable for the caller to increase the chances of an optimal interaction. Using this embodiment, a contact center could preferentially match the caller with an agent who does not have a high grade for generating revenue or who would not otherwise be an acceptable match, because the chance of a sale is still likely given the caller's past purchase behavior. This strategy for matching would leave available other agents who could have otherwise been occupied with a contact interaction with the caller. Alternatively, the contact center may instead seek to guarantee that the caller is matched with an agent with a high grade for generating revenue, irrespective of what the matches generated using caller data and agent demographic or psychographic data may indicate.

In one example, affinity data and an affinity database developed by the described examples may be one in which a caller's contact outcomes are tracked across the various agent data. Such an analysis might indicate, for example, that the caller is most likely to be satisfied with a contact if they are matched to an agent of similar gender, race, age, or even with a specific agent. Using this embodiment, the present invention could preferentially match a caller with a specific agent or type of agent that is known from the caller affinity data to have generated an acceptable optimal interaction.

Affinity databases can provide particularly actionable information about a caller when commercial, client, or publicly-available database sources may lack information about the caller. This database development can also be used to further enhance contact routing and agent-to-caller matching even in the event that there is available data on the caller, as it may drive the conclusion that the individual caller's contact outcomes may vary from what the commercial databases might imply. As an example, if the present invention was to rely solely on commercial databases in order to match a caller and agent, it may predict that the caller would be best matched to an agent of the same gender to achieve optimal customer satisfaction. However, by including affinity database information developed from prior interactions with the caller, the present invention might more accurately predict that the caller would be best matched to an agent of the opposite gender to achieve optimal customer satisfaction.

Another aspect of the present invention is that it may develop affinity databases that comprise revenue generation, cost, and customer satisfaction performance data of individual agents as matched with specific caller demographic, psychographic, or other business-relevant characteristics (referred to in this application as "agent affinity data"). An affinity database such as this may, for example, result in the present invention predicting that a specific agent performs best in interactions with callers of a similar age, and less well in interactions with a caller of a significantly older or younger age. Similarly this type of affinity database may result in the present invention predicting that an agent with certain agent affinity data handles callers originating from a particular geography much better than the agent handles callers from other geographies. As another example, the present invention may predict that a particular agent performs well in circumstances in which that agent is connected to an irate caller.

Though affinity databases are preferably used in combination with agent data and caller data that pass through a pattern matching algorithm to generate matches, information stored in affinity databases can also be used independently of agent data and caller data such that the affinity information is the only information used to generate matches. For instance, in some examples, the first level of processing may include a first computer model that relies on both a pattern matching algorithm and affinity data, and a second computer model that relies on affinity data alone.

Many of the techniques described here may be implemented in hardware or software, or a combination of the two. Preferably, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices. Moreover, each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

Figure 9:
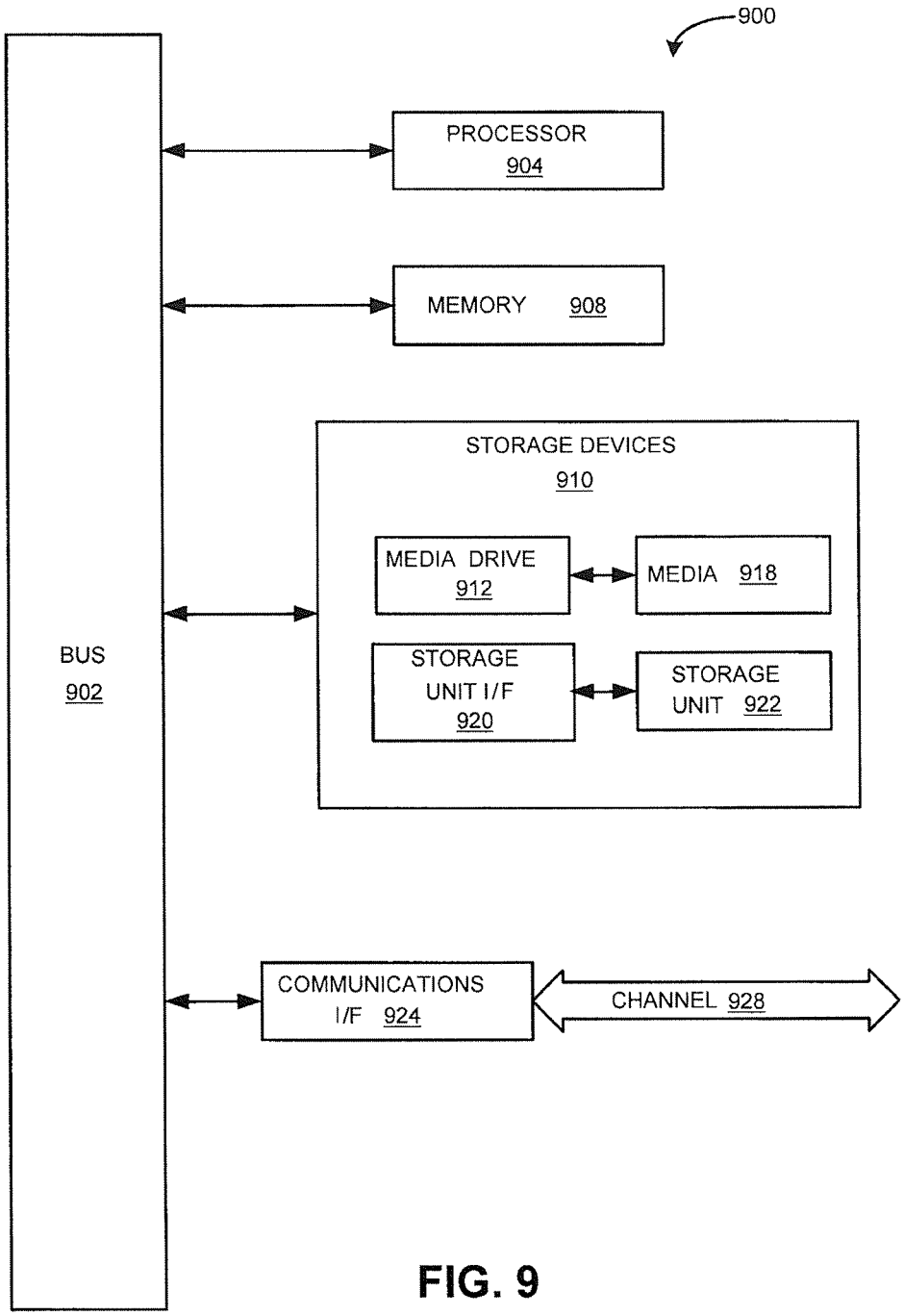
FIG. 9 illustrates a typical computing system that may be employed to implement some or all processing functionality in certain embodiments of the invention.

FIG. 9 illustrates a typical computing system 900 that may be employed to implement processing functionality in embodiments of the invention. Computing systems of this type may be used in clients and servers, for example. Those skilled in the relevant art will also recognize how to implement the invention using other computer systems or architectures. Computing system 900 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 900 can include one or more processors, such as a processor 904. Processor 904 can be implemented using a general or special purpose processing engine such as, for example, a microprocessor, microcontroller or other control logic. In this example, processor 904 is connected to a bus 902 or other communication medium.

Computing system 900 can also include a main memory 908, such as random access memory (RAM) or other dynamic memory, for storing information and instructions to be executed by processor 904. Main memory 908 also may be used for storing temporary variables or other intermediate information during execution of instructions to be executed by processor 904. Computing system 900 may likewise include a read only memory ("ROM") or other static storage device coupled to bus 902 for storing static information and instructions for processor 904.

The computing system 900 may also include information storage system 910, which may include, for example, a media drive 912 and a removable storage interface 920. The media drive 912 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 918 may include, for example, a hard disk, floppy disk, magnetic tape, optical disk, CD or DVD, or other fixed or removable medium that is read by and written to by media drive 912. As these examples illustrate, the storage media 918 may include a computer-readable storage medium having stored therein particular computer software or data.

In alternative embodiments, information storage system 910 may include other similar components for allowing computer programs or other instructions or data to be loaded into computing system 900. Such components may include, for example, a removable storage unit 922 and an interface 920, such as a program cartridge and cartridge interface, a removable memory (for example, a flash memory or other removable memory module) and memory slot, and other removable storage units 922 and interfaces 920 that allow software and data to be transferred from the removable storage unit 918 to computing system 900.

Computing system 900 can also include a communications interface 924. Communications interface 924 can be used to allow software and data to be transferred between computing system 900 and external devices. Examples of communications interface 924 can include a modem, a network interface (such as an Ethernet or other NIC card), a communications port (such as for example, a USB port), a PCMCIA slot and card, etc. Software and data transferred via communications interface 924 are in the form of signals which can be electronic, electromagnetic, optical or other signals capable of being received by communications interface 924. These signals are provided to communications interface 924 via a channel 928. This channel 928 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable medium" and the like may be used generally to refer to physical, tangible media such as, for example, memory 908, storage media 918, or storage unit 922. These and other forms of computer-readable media may be involved in storing one or more instructions for use by processor 904, to cause the processor to perform specified operations. Such instructions, generally referred to as "computer program code" (which may be grouped in the form of computer programs or other groupings), when executed, enable the computing system 900 to perform features or functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 900 using, for example, removable storage media 918, drive 912 or communications interface 924. The control logic (in this example, software instructions or computer program code), when executed by the processor 904, causes the processor 904 to perform the functions of the invention as described herein, It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

The above-described embodiments of the present invention are merely meant to be illustrative and not limiting. Various changes and modifications may be made without departing from the invention in its broader aspects. The appended claims encompass such changes and modifications within the spirit and scope of the invention.

I claim:

[1. A method for routing callers to agents in a call-center routing environment, the method comprising the acts of:

receiving, by one or more computers, input data associated with callers in a set of callers and agents in a set of agents at a first layer of processing;

processing, by the one or more computers, the input data associated with the callers in the set of callers and the agents in the set of agents using a first measurement algorithm in a pair-wise fashion in the first layer of processing, to output respective measurement data for each of a first set of caller-agent pairs;

processing, by the one or more computers, the input data associated with the callers in the set of callers and the agents in the set of agents using a second measurement algorithm in a pair-wise fashion in the first layer of processing, to output respective measurement data for each of the first set of caller-agent pairs;

receiving, by the one or more computers, the output measurement data from each of the first measurement algorithm and the second measurement algorithm at a second layer of processing;

processing, by the one or more computers, the caller-agent pair output measurement data from each of the first measurement algorithm and the second measurement algorithm by an algorithm to weight the caller-agent pair output measurement data of one of the measurement algorithms relative to the other of the measurement algorithms in the second layer of processing;

selecting, by the one or more computers, a caller-agent pair based at least in part on weighted caller-agent pair output data; and mapping, by the one or more computers, the caller in the caller-agent pair selected to the agent in the caller-agent pair selected.]

[2. The method of claim 1, wherein the processing the input data steps comprises scoring each of the caller-agent pairs using the respective algorithm for the respective processing step, wherein the output measurement data from the first measurement algorithm comprises a respective score for each of the first set of caller-agent pairs and is based on at least a first data associated with one or both of the set of the callers and the set of the agents; and wherein the output measurement data from the second measurement algorithm comprises a respective score, wherein the scores from the first and second measurement algorithms for each of the caller-agent pairs are output to the second layer of processing.]

[3. The method of claim 2, wherein scoring the caller-agent pairs according to the second measurement algorithm is based on at least a second data associated with one or both of the set of callers and the set of agents.]

[4. The method of claim 2, wherein scoring the caller-agent pairs comprises ranking agents based on performance.]

[5. The method of claim 2, wherein scoring the caller-agent pairs comprises determining a suitability score for a desired output performance.]

[6. The method of claim 2, wherein one of the measurement algorithms comprises a multi-data element pattern matching algorithm utilizing caller data associated with multiple callers in the set of callers and agent data associated with multiple agents in the set of agents.]

[7. The method of claim 1, wherein one of the measurement algorithms comprises a performance based matching algorithm based on performance data of at least two of the agents.]

[8. The method of claim 1, wherein one of the measurement algorithms comprises a multi-data element pattern matching algorithm utilizing caller data associated with multiple callers from the set of callers and agent data associated with multiple agents from the set of agents.]

[9. The method of claim 1, wherein one of the measurement algorithms utilizes affinity data associated with one or both of the agents and callers.]

[10. The method of claim 1, wherein at least one of the at least two measurement algorithms comprises a neural network algorithm.]

[11. The method of claim 1, wherein the second layer of processing comprises a neural network algorithm.]

[12. The method of claim 1, further comprising:

providing an electronic interface, by the one or more computers, to change the weighting of the output measurement data from one of the measurement algorithms relative to the other of the measurement algorithms in the second layer of processing; and generating, by the one or more computers, display data for a display interface, with the display data comprising an estimated effect of the change of the weighting on one or more selected from the group of cost, revenue generation, and customer satisfaction.]

[13. The method of claim 1, wherein the caller-agent pair output measurement data from the first measurement algorithm and from the second measurement algorithm are weighted equally.]

[14. The method of claim 1, wherein the caller-agent pair output measurement data from the first measurement algorithm and from the second measurement algorithm are weighted unequally.]

15. A system for routing callers to agents in a call-center routing environment, comprising:

one or more computers configured with computer-readable program code to perform, when executed, the steps *of*:

[receiving, by the one or more computers, input data associated with callers in a set of callers and agents in a set of agents at a first layer of processing;]

processing, by [the] one or more computers *communicatively coupled to and configured to operate in the call-center routing environment*, [the] input data associated with [the] callers in [the] *a* set of callers and [the] agents in [the] *a* set of agents using a first measurement algorithm in a pair-wise fashion in [the] *a* first layer of processing, to output [respective] *first* measurement data for each *caller-agent pair* of a [first] set of caller-agent pairs;

processing, by the one or more computers, the input data associated with the callers in the set of callers and the agents in the set of agents using a second measurement algorithm in a pair-wise fashion in the first layer of processing, to output [respective] *second* measurement data for each *caller-agent pair* of the [first] set of caller-agent pairs;

receiving, by the one or more computers, [the output measurement data from each of the first measurement algorithm and the second measurement algorithm] at a second layer of processing, *the first measurement data and the second measurement data for each caller-agent pair of the set of caller-agent pairs*;

processing, by the one or more computers, the [caller-agent pair output measurement data from each of the first measurement algorithm and the second measurement algorithm by an] *first measurement data and the second measurement data for each caller-agent pair of the set of caller-agent pairs by a weighting* algorithm to weight the [caller-agent pair output] *first* measurement data [of one of the measurement algorithms] *for each caller-agent pair of the set of caller-agent pairs* relative to the [other of the measurement algorithms] *second measurement data for each caller-agent pair of the set of caller-agent pairs* in the second layer of processing, *to output a weighted caller-agent pair output measurement data*;

selecting, by the one or more computers, a caller-agent pair based at least in part on weighted caller-agent pair output *measurement* data; and

[mapping, by the one or more computers, the caller in the caller-agent pair selected to the agent in the caller-agent pair selected]

*establishing, by the one or more computers, in a switch module of the call-center routing environment, a communication channel between the caller and the agent in the selected agent-pair to optimize performance of the call-center routing environment attributable to the weighted caller-agent pair output measurement data.*

[16. The system of claim 15, wherein the program code for processing the input data steps comprises program code for scoring each of the caller-agent pairs using the respective algorithm for the respective processing step, wherein the output measurement data from the first measurement algorithm comprises a respective score for each of the first set of caller-agent pairs and is based on at least a first data associated with one or both of the set of the callers and the set of the agents; and wherein the output measurement data from the second measurement algorithm comprises a respective score for each of the first set of caller-agent pairs, wherein the scores from the first and second measurement algorithms are output to the second layer of processing.]

[17. The system of claim 16, wherein scoring the caller-agent pairs according to the second measurement algorithm is based on at least a second data associated with one or both of the set of callers and the set of agents.]

[18. The system of claim 16, wherein scoring the caller-agent pairs comprises ranking agents based on performance.]

[19. The system of claim 16, wherein scoring the caller-agent pairs comprises determining a suitability score for a desired output performance.]

[20. The system of claim 16, wherein one of the measurement algorithms comprises a multi-data element pattern matching algorithm utilizing caller data associated with multiple callers in the set of callers and agent data associated with multiple agents in the set of agents.]

[21. The system of claim 15, wherein one of the measurement algorithms comprises a performance based matching algorithm based on performance data of at least two of the agents.]

[22. The system of claim 15, wherein one of the measurement algorithms comprises a pattern matching algorithm utilizing caller data associated with multiple callers from the set of callers and agent data associated with multiple agents from the set of agents.]

[23. The system of claim 15, wherein one of the measurement algorithms utilizes affinity data associated with one or both of the agents and callers.]

[24. The system of claim 15, wherein at least one of the at least two measurement algorithms comprises a neural network algorithm.]

[25. The system of claim 15, wherein the second layer of processing comprises a neural network algorithm.]

[26. The system of claim 15, further comprising the one or more computers configured with program code to perform the steps:

providing an electronic interface, by the one or more computers, to change the weighting of the output measurement data from one of the measurement algorithms relative to the other of the measurement algorithms in the second layer of processing; and generating, by the one or more computers, display data for a display interface, with the display data comprising an estimated effect of the change of the weighting on one or more selected from the group of cost, revenue generation, and customer satisfaction.]

[27. The system of claim 15, wherein the caller-agent pair output measurement data from the first measurement algorithm and from the second measurement algorithm are weighted equally.]

[28. The system of claim 15, wherein the caller-agent pair output measurement data from the first measurement algorithm and from the second measurement algorithm are weighted unequally.]

[29. A non-transitory computer readable storage medium comprising computer readable program code for carrying out, when executed by one or more computers, the steps:

receiving, by the one or more computers, input data associated with callers in a set of callers and agents in a set of agents at a first layer of processing;

processing, by the one or more computers, the input data associated with the callers in the set of callers and the agents in the set of agents using a first measurement algorithm in a pair-wise fashion in the first layer of processing, to output respective measurement data for each of a first set of caller-agent pairs;

processing, by the one or more computers, the input data associated with the callers in the set of callers and the agents in the set of agents using a second measurement algorithm in a pair-wise fashion in the first layer of processing, to output respective measurement data for each of the first set of caller-agent pairs;

receiving, by the one or more computers, the output measurement data from each of the first measurement algorithm and the second measurement algorithm at a second layer of processing;

processing, by the one or more computers, the caller-agent pair output measurement data from each of the first measurement algorithm and the second measurement algorithm by an algorithm to weight the caller-agent pair output measurement data of one of the measurement algorithms relative to the other of the measurement algorithms in the second layer of processing;

selecting, by the one or more computers, a caller-agent pair based at least in part on weighted caller-agent pair output data; and mapping, by the one or more computers, the caller in the caller-agent pair selected to the agent in the caller-agent pair selected.]

[30. The computer readable storage medium of claim 29, wherein the program code for processing the input data steps comprises program code for scoring each of the caller-agent pairs using the respective algorithm for the respective processing step, wherein the output measurement data from the first measurement algorithm comprises a respective score for each of the first set of caller-agent pairs and is based on at least a first data associated with one or both of the set of the callers and the set of the agents; and wherein the output measurement data from the second measurement algorithm comprises a respective score for each of the first set of caller-agent pairs, wherein the scores from the first and second measurement algorithms are output to the second layer of processing.]

[31. The computer readable storage medium of claim 30, wherein scoring the caller-agent pairs according to the second measurement algorithm is based on at least a second data associated with one or both of the set of callers and the set of agents.]

[32. The computer readable storage medium of claim 30, wherein scoring the caller-agent pairs comprises ranking agents based on performance.]

[33. The computer readable storage medium of claim 30, wherein scoring the caller-agent pairs comprises determining a suitability score for a desired output performance.]

[34. The computer readable storage medium of claim 30, wherein one of the measurement algorithms comprises a multi-data element pattern matching algorithm utilizing caller data associated with multiple callers in the set of callers and agent data associated with multiple agents in the set of agents.]

[35. The computer readable storage medium of claim 29, wherein one of the measurement algorithms comprises a performance based matching algorithm based on performance data of at least two of the agents.]

[36. The computer readable storage medium of claim 29, wherein one of the measurement algorithms comprises a pattern matching algorithm utilizing caller data associated with multiple callers from the set of callers and agent data associated with multiple agents from the set of agents.]

[37. The computer readable storage medium of claim 29, wherein one of the measurement algorithms utilizes affinity data associated with one or both of the agents and callers.]

[38. The computer readable storage medium of claim 29, wherein at least one of the at least two measurement algorithms comprises a neural network algorithm.]

[39. The computer readable storage medium of claim 29, wherein the second layer of processing comprises a neural network algorithm.]

[40. The computer readable storage medium of claim 29, further comprising program code to perform the steps:

providing an electronic interface, by the one or more computers, to change the weighting of the output measurement data from one of the measurement algorithms relative to the other of the measurement algorithms in the second layer of processing; and generating, by the one or more computers, display data for a display interface, with the display data comprising an estimated effect of the change of the weighting on one or more selected from the group of cost, revenue generation, and customer satisfaction.]

[41. The computer readable storage medium of claim 29, wherein the caller-agent pair output measurement data from the first measurement algorithm and from the second measurement algorithm are weighted equally.]

[42. The computer readable storage medium of claim 29, wherein the caller-agent pair output measurement data from the first measurement algorithm and from the second measurement algorithm are weighted unequally.]

*43. A method for handling contacts and agents in a contact center system comprising:*

*determining, by at least one computer processor communicatively coupled to and configured to operate in the contact center system, if a first contact has previously interacted with a first agent, wherein determining the previous interaction is based at least in part upon:*

*processing, by the at least one computer processor, input data associated with contacts in a set of contacts and agents in a set of agents using a first measurement algorithm in a pair-wise fashion in a first layer of processing, to output first measurement data for each caller-agent pair of a set of contact-agent pairs;*

*processing, by the at least one computer processor, the input data associated with the contacts in the set of contacts and the agents in the set of agents using a second measurement algorithm in a pair-wise fashion in the first layer of processing, to output second measurement data for each caller-agent pair of the set of contact-agent pairs;*

*receiving, by the at least one computer processor, at a second layer of processing, the first measurement data and the second measurement data for each caller-agent pair of the set of caller-agent pairs;*

*processing, by the at least one computer processor, the first measurement data and the second measurement data for each contact-agent pair of the set of contact-agent pairs by a weighting algorithm to weight the first measurement data for each contact-agent pair of the set of contact-agent pairs relative to the second measurement data for each contact-agent pair of the set of contact-agent pairs in the second layer of processing, to output a weighted contact-agent pair output measurement data; and*

*selecting, by the at least one computer processor, a contact-agent pair based at least in part on the weighted contact-agent pair output measurement data;*

*matching, by the at least one computer processor, the first contact with the first agent based at least in part upon a previous interaction between the first contact and the first agent; and*

*establishing, by the at least one computer processor, in a switch module of the contact center system, a communication channel between the first agent and the first contact to optimize performance of the contact center system attributable to the previous interaction between the first contact and the first agent.*

*44. The method of claim 43, wherein contact outcome information about a previous interaction between the first contact and the first agent is stored in an affinity database.*

*45. The method of claim 43, wherein a round-robin contact routing algorithm matches the first agent with a second contact waiting in a queue of contacts.*

*46. The method of claim 43, wherein a pattern-matching algorithm matches the first agent with a second contact waiting in a queue of contacts.*

*47. The method of claim 43, wherein a round-robin contact routing algorithm matches the first contact with a second agent available for connection with a contact.*

*48. The method of claim 43, wherein a pattern-matching algorithm matches the first contact with a second agent available for connection with a contact.*

*49. The method of claim 43, further comprising:*

*determining, by the at least one computer processor, a first expected outcome based on matching the first contact with the first agent;*

*determining, by the at least one computer processor, a second expected outcome based on matching the first contact with a second agent selected by a pattern-matching algorithm; and*

*comparing, by the at least one computer processor, the first expected outcome with the second expected outcome.*

*50. A system for handling contacts and agents in a contact center system comprising:*

*at least one computer processor communicatively coupled to and configured to operate in the contact center system, wherein the at least one computer processor is configured to:*

*determine if a first contact has previously interacted with a first agent, wherein determining the previous interaction is based at least in part upon:*

*processing, by the at least one computer processor, input data associated with contacts in a set of contacts and agents in a set of agents using a first measurement algorithm in a pair-wise fashion in a first layer of processing, to output first measurement data for each contact-agent pair of a set of contact-agent pairs;*

*processing, by the at least one computer processor, the input data associated with the contacts in the set of contacts and the agents in the set of agents using a second measurement algorithm in a pair-wise fashion in the first layer of processing, to output second measurement data for each contact-agent pair of the set of contact-agent pairs;*

*receiving, by the at least one computer processor, at a second layer of processing, the first measurement data and the second measurement data for each contact-agent pair of the set of contact-agent pairs;*

*processing, by the at least one computer processor, the first measurement data and the second measurement data for each contact-agent pair of the set of contact-agent pairs by a weighting algorithm to weight the first measurement data for each contact-agent pair of the set of contact-agent pairs relative to the second measurement data for each contact-agent pair of the set of contact-agent pairs in the second layer of processing, to output a weighted contact-agent pair output measurement data; and*

*selecting, by the at least one computer processor, a contact-agent pair based at least in part on the weighted contact-agent pair output measurement data;*

*match the first contact with the first agent based at least in part upon a previous interaction between the first contact and the first agent; and*

*establish, in a switch module of the contact center system, a communication channel between the first agent and the first contact to optimize performance of the contact center system attributable to the previous interaction between the first contact and the first agent.*

*51. The system of claim 50, wherein contact outcome information about a previous interaction between the first contact and the first agent is stored in an affinity database.*

*52. The system of claim 50, wherein a round-robin contact routing algorithm matches the first agent with a second contact waiting in a queue of contacts.*

*53. The system of claim 50, wherein a pattern-matching algorithm matches the first agent with a second contact waiting in a queue of contacts.*

*54. The system of claim 50, wherein a round-robin contact routing algorithm matches the first contact with a second agent available for connection with a contact.*

*55. The system of claim 50, wherein a pattern-matching algorithm matches the first contact with a second agent available for connection with a contact.*

*56. The system of claim 50, wherein the at least one computer processor is further configured to:*

*determine a first expected outcome based on matching the first contact with the first agent;*

*determine a second expected outcome based on matching the first contact with a second agent selected by a pattern-matching algorithm; and*

*compare the first expected outcome with the second expected outcome.*

*57. An article of manufacture for handling contacts and agents in a contact center system comprising:*

*a non-transitory processor readable medium; and*

*instructions stored on the medium;*

*wherein the instructions are configured to be readable from the medium by at least one computer processor communicatively coupled to and configured to operate in the contact center system and thereby cause the at least one computer processor to operate so as to:*

*determine if a first contact has previously interacted with a first agent, wherein determining the previous interaction is based at least in part upon:*

*processing, by the at least one computer processor, input data associated with contacts in a set of contacts and agents in a set of agents using a first measurement algorithm in a pair-wise fashion in a first layer of processing, to output first measurement data for each contact-agent pair of a set of contact-agent pairs;*

*processing, by the at least one computer processor, the input data associated with the contacts in the set of contacts and the agents in the set of agents using a second measurement algorithm in a pair-wise fashion in the first layer of processing, to output second measurement data for each contact-agent pair of the set of contact-agent pairs;*

*receiving, by the at least one computer processor, at a second layer of processing, the first measurement data and the second measurement data for each contact-agent pair of the set of contact-agent pairs;*

*processing, by the at least one computer processor, the first measurement data and the second measurement data for each contact-agent pair of the set of contact-agent pairs by a weighting algorithm to weight the first measurement data for each contact-agent pair of the set of contact-agent pairs relative to the second measurement data for each contact-agent pair of the set of contact-agent pairs in the second layer of processing, to output a weighted contact-agent pair output measurement data; and*

*selecting, by the at least one computer processor, a contact-agent pair based at least in part on the weighted contact-agent pair output measurement data;*

*match the first contact with the first agent based at least in part upon a previous interaction between the first contact and the first agent; and*

*establish, in a switch module of the contact center system, a communication channel between the first agent and the first contact to optimize performance of the contact center system attributable to the previous interaction between the first contact and the first agent.*

*58. The article of manufacture of claim 57, wherein contact outcome information about a previous interaction between the first contact and the first agent is stored in an affinity database.*

*59. The article of manufacture of claim 57, wherein a round-robin contact routing algorithm matches the first agent with a second contact waiting in a queue of contacts.*

*60. The article of manufacture of claim 57, wherein a pattern-matching algorithm matches the first agent with a second contact waiting in a queue of contacts.*

*61. The article of manufacture of claim 57, wherein a round-robin contact routing algorithm matches the first contact with a second agent available for connection with a contact.*

*62. The article of manufacture of claim 57, wherein a pattern-matching algorithm matches the first contact with a second agent available for connection with a contact.*

* * * * *